US010210345B2

(12) United States Patent
Beye et al.

(10) Patent No.: US 10,210,345 B2
(45) Date of Patent: Feb. 19, 2019

(54) INTELLIGENT CREDENTIAL SELECTION SYSTEM

(71) Applicant: Bank of America Corporation, Charlotte, NC (US)

(72) Inventors: Rick A. Beye, Lambertville, NJ (US); Ramitha Jaya Kumar, Plainsboro Township, NJ (US); Yonatan A. Teitz, Englewood, NJ (US); Vamshi Chilukamari, Edison, NJ (US); Ran Bi, Ewing, NJ (US); Karrin A. Russo, Robbinsville, NJ (US)

(73) Assignee: Bank of America Corporation, Charlotte, NC (US)

( * ) Notice: Subject to any disclaimer, the term of this patent is extended or adjusted under 35 U.S.C. 154(b) by 216 days.

(21) Appl. No.: 15/228,864

(22) Filed: Aug. 4, 2016

(65) Prior Publication Data
US 2018/0039791 A1 Feb. 8, 2018

(51) Int. Cl.
| | |
|---|---|
| *G06F 17/30* | (2006.01) |
| *G06F 21/62* | (2013.01) |
| *G06Q 10/06* | (2012.01) |
| *G06Q 50/22* | (2018.01) |
| *G06Q 50/26* | (2012.01) |

(52) U.S. Cl.
CPC ... *G06F 21/6227* (2013.01); *G06Q 10/06315* (2013.01); *G06Q 50/22* (2013.01); *G06Q 50/26* (2013.01); *G06F 2221/2141* (2013.01)

(58) Field of Classification Search
USPC .............................. 707/720; 705/16, 14, 26
See application file for complete search history.

(56) References Cited

U.S. PATENT DOCUMENTS

| | | | |
|---|---|---|---|
| 5,221,838 A | 6/1993 | Gutman et al. | |
| 5,401,946 A | 3/1995 | Weinblatt | |
| 5,687,322 A | 11/1997 | Deaton et al. | |
| 6,018,723 A | 1/2000 | Siegel et al. | |
| 6,055,573 A | 4/2000 | Gardenswartz et al. | |
| 6,334,110 B1 | 12/2001 | Walter et al. | |
| 6,934,689 B1 | 8/2005 | Ritter et al. | |
| 7,673,799 B2 | 3/2010 | Hart et al. | |
| 8,442,859 B1 | 5/2013 | Broms et al. | |
| 8,621,575 B2 | 12/2013 | Wiseman et al. | |
| 8,738,418 B2 | 5/2014 | Winters | |

(Continued)

*Primary Examiner* — Hung T Vy
(74) *Attorney, Agent, or Firm* — Michael A. Springs; Moore & Van Allen PLLC; James C. Edwards

(57) ABSTRACT

Embodiments of the invention are directed to a system, method, or computer program product for generating communicable linkages that collectively provide a cloud-based dynamic credential selection and implementation system. The system generates a user profile containing user preferences, historic trends, and user resources based on information collected from a user and user associated accounts. The dynamic credential selection and implementation system is triggered by the user signaling the system of a proposed transaction. The system requests updated resource characteristics from resource managers. The user profile, resource characteristics and transaction characteristics are evaluated and ranked by the dynamic credential selection and implementation system before completion of the transaction, which in some embodiments requires user approval of the selected resource.

20 Claims, 15 Drawing Sheets

(56) References Cited

U.S. PATENT DOCUMENTS

| | | | |
|---|---|---|---|
| 9,021,363 | B2 | 4/2015 | Blake, III et al. |
| 9,280,771 | B2 * | 3/2016 | Barillaud et al. |
| 10,108,996 | B2 * | 10/2018 | Beye ................. G06Q 30/0611 |
| 2002/0062249 | A1 * | 5/2002 | Iannacci ................ G06Q 20/10 705/14.1 |
| 2006/0165060 | A1 | 7/2006 | Dua |
| 2007/0057038 | A1 | 3/2007 | Gannon |
| 2007/0084913 | A1 | 4/2007 | Weston |
| 2007/0278290 | A1 | 12/2007 | Messerges et al. |
| 2008/0000964 | A1 | 1/2008 | Flake et al. |
| 2009/0018924 | A1 | 1/2009 | Roberts |
| 2009/0254476 | A1 | 10/2009 | Sharma et al. |
| 2011/0231305 | A1 | 9/2011 | Winters |
| 2013/0046600 | A1 | 2/2013 | Coppinger |
| 2014/0279097 | A1 * | 9/2014 | Alshobaki .............. G06Q 20/10 705/16 |
| 2015/0142604 | A1 | 5/2015 | Kneen |
| 2015/0161730 | A1 | 6/2015 | Sandhu et al. |
| 2016/0239823 | A1 | 8/2016 | Bengtsson et al. |

* cited by examiner

INTELLIGENT CREDENTIAL SELECTION SYSTEM

BACKGROUND

With advancements in communication technology and resource storage, managers of resources are now able to offer a wide variety of terms to fit the needs of users. The terms and/or user needs may continually change over a period of time without adjustments to resource utilization.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for dynamic intelligent resource selection and implementation. The system may include a computer apparatus including a processor, a memory device, and a communication device; and a software module stored in the memory, comprising computer-readable instructions that when executed by the processor cause the processor to identify user resources and one or more resource managers associated with the identified user resources; identify item categories for items included in the pending transaction; access a user profile, wherein the user profile comprises user resources, user preferences, historic resource trends, and resource manager terms for resource use; generate a ranked list of resources for providing the total resource amount to the merchant, wherein the ranked list comprises a highest ranked user resource; in response to generating a ranked list of resources, access additional resource information to determine whether an additional resource would be ranked higher than the highest ranked user resource based on the items being purchased; and, if so, initiate presentation of the additional resource to the user.

In some embodiments, the computer-readable instructions when executed by the processor further cause the processor to, in response to generating the ranked list of resources, automatically select the highest ranked user resource for providing the total resource amount to the merchant; and initiate transmission of credential associated with the selected user resource to the merchant for providing the total resource amount to the merchant.

In some embodiments, the computer-readable instructions when executed by the processor further cause the processor to, in response to generating a ranked list of resources, determine whether a different user weighting would result in a more beneficial highest ranked user resource for performing the pending transaction; and, if so, initiate presentation of a recommended re-weighting to the user.

In some embodiments, the computer-readable instructions when executed by the processor further cause the processor to determine that a higher weighting for rewards would be more beneficial to the user; and initiate presentation of a recommended re-weighting comprising a higher weighting associated with rewards to the user.

In some embodiments, determining comprises determining that the item categories include items that match rewards associated with at least one of the resources available to the user for payment.

In some embodiments, the computer-readable instructions when executed by the processor further cause the processor to determine that a high weighting for APR would be more beneficial to the user; and initiate presentation of a recommended re-weighting comprising a higher weighting associated with APR to the user.

In some embodiments, determining comprises determining that at least one account associated with a resource available to the user has an APR above a high threshold.

In some embodiments, the computer-readable instructions when executed by the processor further cause the processor to trigger a communicable linkage with the one or more resource managers based on receiving a determined total resource amount required by a merchant; and open the communicable linkage with the one or more resource managers for resource manager updating resource characteristics associated with the user resources.

In some embodiments, the computer-readable instructions when executed by the processor further cause the processor to initiate presentation of the selected user resource and the ranked list of resources from the one or more resource managers to the user device; and enable user selection of one of the ranked list of resources for providing the total resource amount to the merchant.

In some embodiments, the computer-readable instructions when executed by the processor further cause the processor to generate a confidence score of the resources on the ranked list of resources, wherein the confidence score comprises a confidence of the user employing a specific resource for providing the total resource amount to the merchant and completing a transaction, wherein generating the confidence score is based on weighted factors, wherein the weighted factors may include in descending order of weighted value: user preferences, past transaction data, historic trends, and/or location data associated with the user; identify a first resource on the ranked list of resources with a confidence score that meets or exceeds a predetermined confidence limit; and transmit, based on identifying the first resource, the first resource on the ranked list of resources, to the merchant for providing the total resource amount to the merchant and completing the transaction.

In some embodiments, the one or more resource managers comprise financial institutions that provide a debit card, credit card, and/or line of credit to the user for providing the total resource amount to the merchant and completing a transaction.

In some embodiments, generating the ranked list of resources from the one or more resource managers further comprises analyzing the user preferences, wherein the user preferences include a preferred form of reward, incentive, and/or discount such as cash back, more reward points, lower interest rates, and/or the like provided to the user by an associated resource relative to resource characteristics set forth by the one or more resource managers.

In some embodiments, triggering the communicable linkage with the one or more resource managers based on determining the total resource amount required by the merchant further comprises receiving from the user device the determined total resource amount required by the merchant; and, in response to receiving from the user device the determined total resource amount required by the merchant, establishing a communication link between the user device and the cloud-based dynamic resource selection and implementation system.

In some embodiments, generating the user profile comprises pushing a user profile comprising user preference selectable indicators to the user device; receiving selected user preferences from the user device based on the pushing of the user profile; identifying historic trends associated with user accounts; and allowing the user to modify the user specific competitive proposal profile on the user device.

In some embodiments, the computer-readable instructions when executed by the processor further cause the processor to generate a cloud-based dynamic payment decisioning application, wherein the cloud-based dynamic payment decisioning application enables for communicable linkage between the resource managers systems, the user device, and a merchant point-of-transaction device for integrative transaction completion.

In some embodiments, the wherein the computer-readable instructions when executed by the processor further cause the processor to provide, to the user, additional resource sign-up information; receive, from the user, confirmation that the user desires to sign-up for the additional resource; in response, automatically sign-up the user for the additional resource; receive confirmation from a resource manager corresponding to the additional resource that the user has been successfully signed up for the additional resource; in response to receiving confirmation from the resource manager, add the additional resource to a digital wallet of the user; and complete the pending transaction using the additional resource.

According to embodiments of the invention, a computer program product includes at least one non-transitory computer-readable medium having computer-readable program code portions embodied therein, the computer-readable program code portions comprising an executable portion configured for identifying user resources and one or more resource managers associated with the identified user resources; an executable portion configured for identifying item categories for items included in the pending transaction; an executable portion configured for accessing a user profile, wherein the user profile comprises user resources, user preferences, historic resource trends, and resource manager terms for resource use; an executable portion configured for generating a ranked list of resources for providing the total resource amount to the merchant, wherein the ranked list comprises a highest ranked user resource; an executable portion configured for, in response to generating a ranked list of resources, access additional resource information to determine whether an additional resource would be ranked higher than the highest ranked user resource based on the items being purchased; and an executable portion configured for, if so, initiate presentation of the additional resource to the user.

In some embodiments, the computer-readable program code further comprises an executable portion configured for, in response to generating the ranked list of resources, automatically selecting the highest ranked user resource for providing the total resource amount to the merchant; and an executable portion configured for initiating transmission of credential associated with the selected user resource to the merchant for providing the total resource amount to the merchant.

In some embodiments, the computer-readable program code further comprises an executable portion configured for, in response to generating a ranked list of resources, determining whether a different user weighting would result in a more beneficial highest ranked user resource for performing the pending transaction; and an executable portion configured for, if so, initiate presentation of a recommended re-weighting to the user. In some such embodiments, the computer-readable program code further comprises an executable portion configured for determining that a higher weighting for rewards would be more beneficial to the user; and an executable portion configured for initiating presentation of a recommended re-weighting comprising a higher weighting associated with rewards to the user.

According to embodiments of the invention, a computer-implemented method for dynamic intelligent resource selection and implementation includes identifying user resources and one or more resource managers associated with the identified user resources; identifying item categories for items included in the pending transaction; accessing a user profile, wherein the user profile comprises user resources, user preferences, historic resource trends, and resource manager terms for resource use; generating a ranked list of resources for providing the total resource amount to the merchant, wherein the ranked list comprises a highest ranked user resource; in response to generating a ranked list of resources, accessing additional resource information to determine whether an additional resource would be ranked higher than the highest ranked user resource based on the items being purchased; and if so, initiating presentation of the additional resource to the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
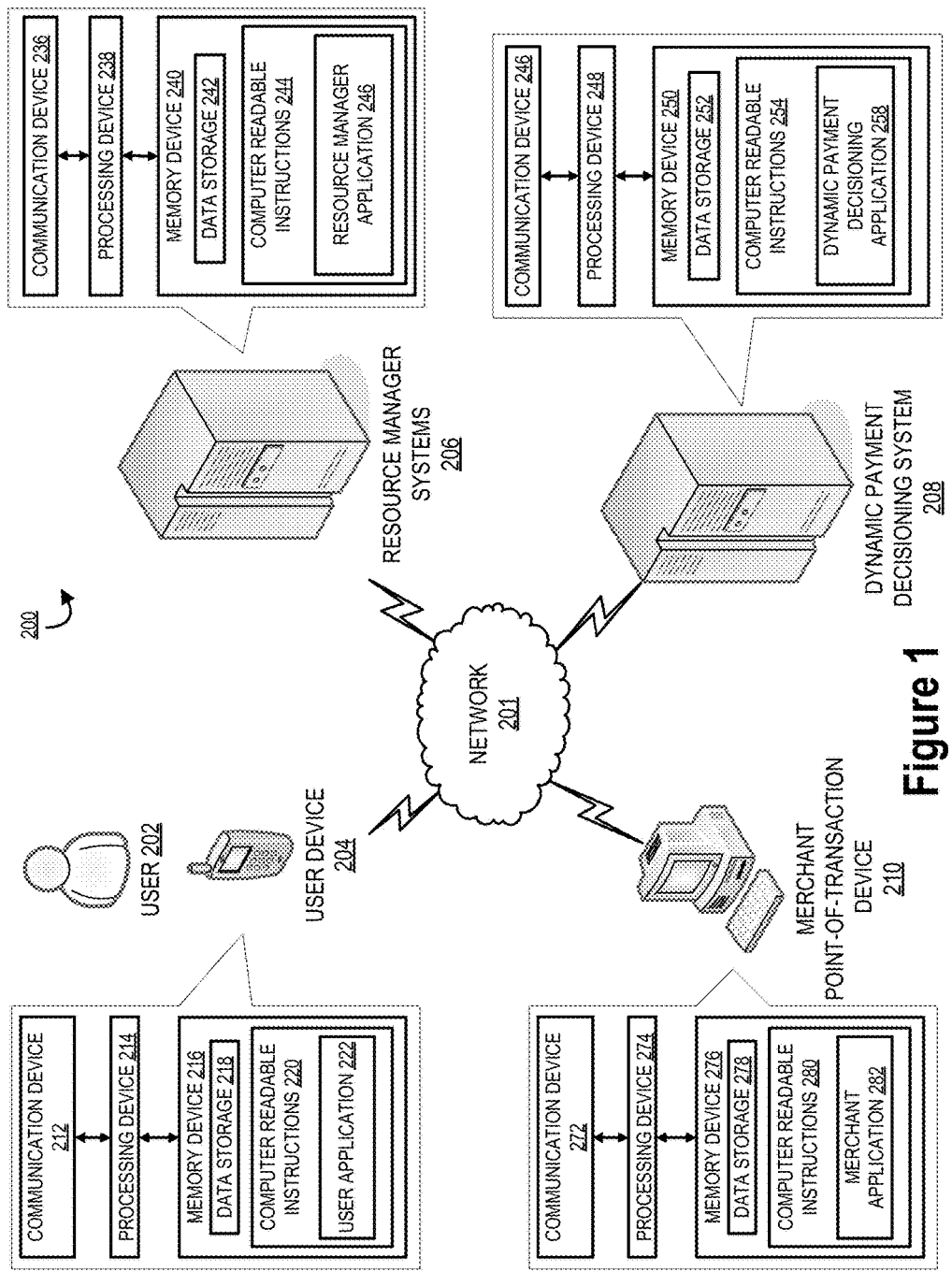
Figure 2:
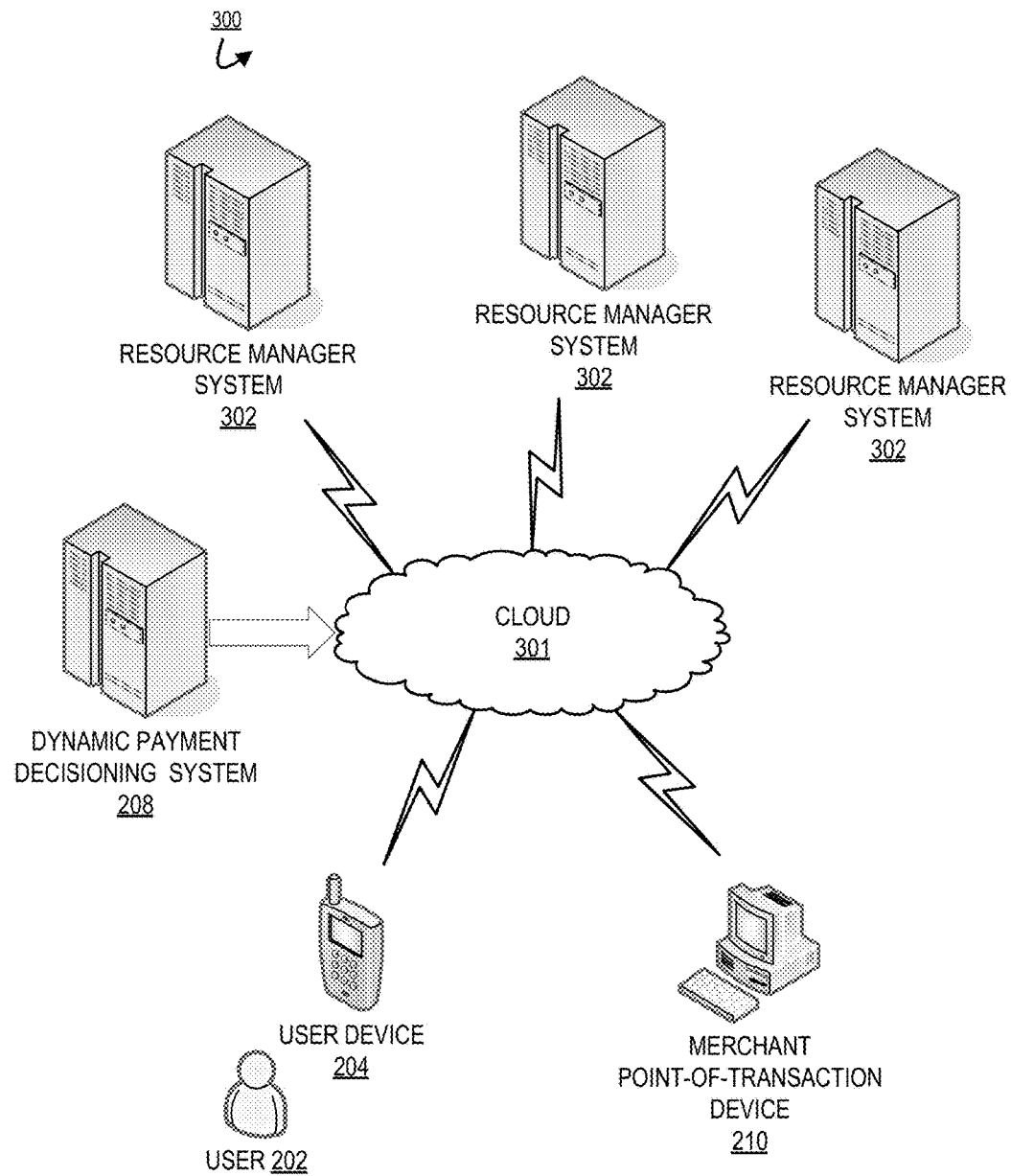

Having thus described embodiments of the invention in general terms, reference will now be made to the accompanying drawings, wherein:

FIG. 1 provides a dynamic payment decisioning system environment, in accordance with embodiments of the invention;

FIG. 2 provides a cloud-based dynamic payment decisioning system environment, in accordance with embodiments of the invention.

Figure 3:
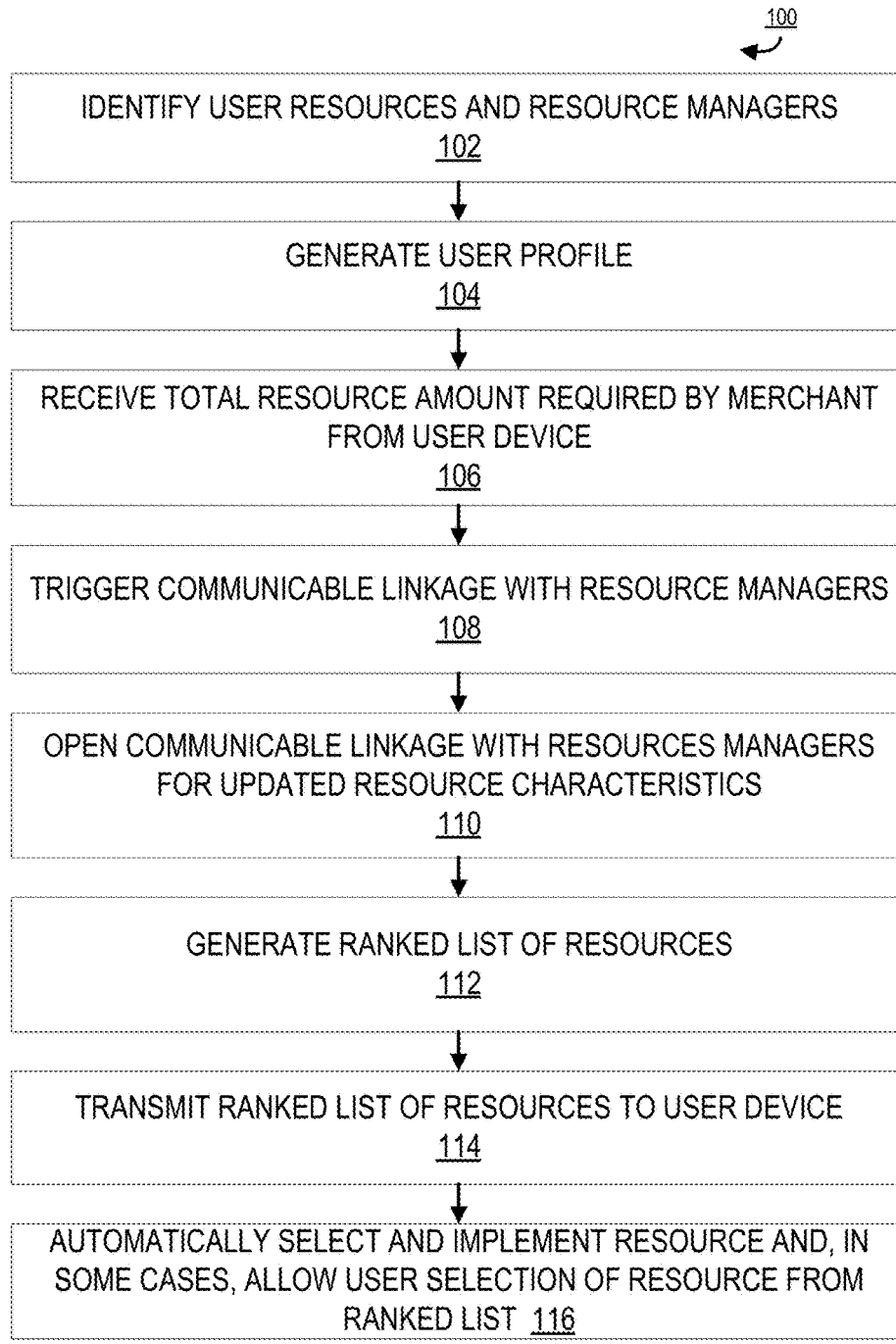
Figure 4:
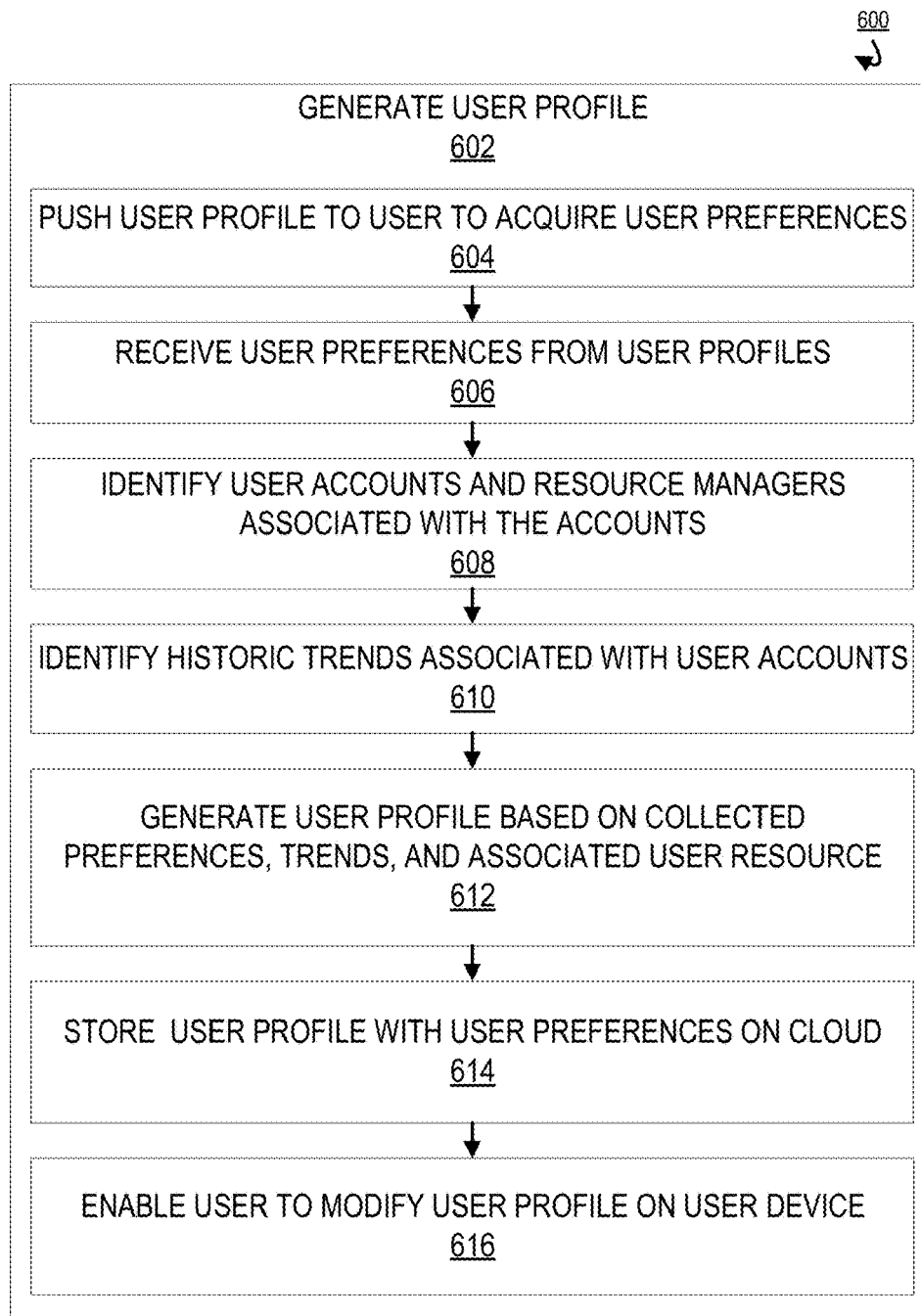
Figure 5:
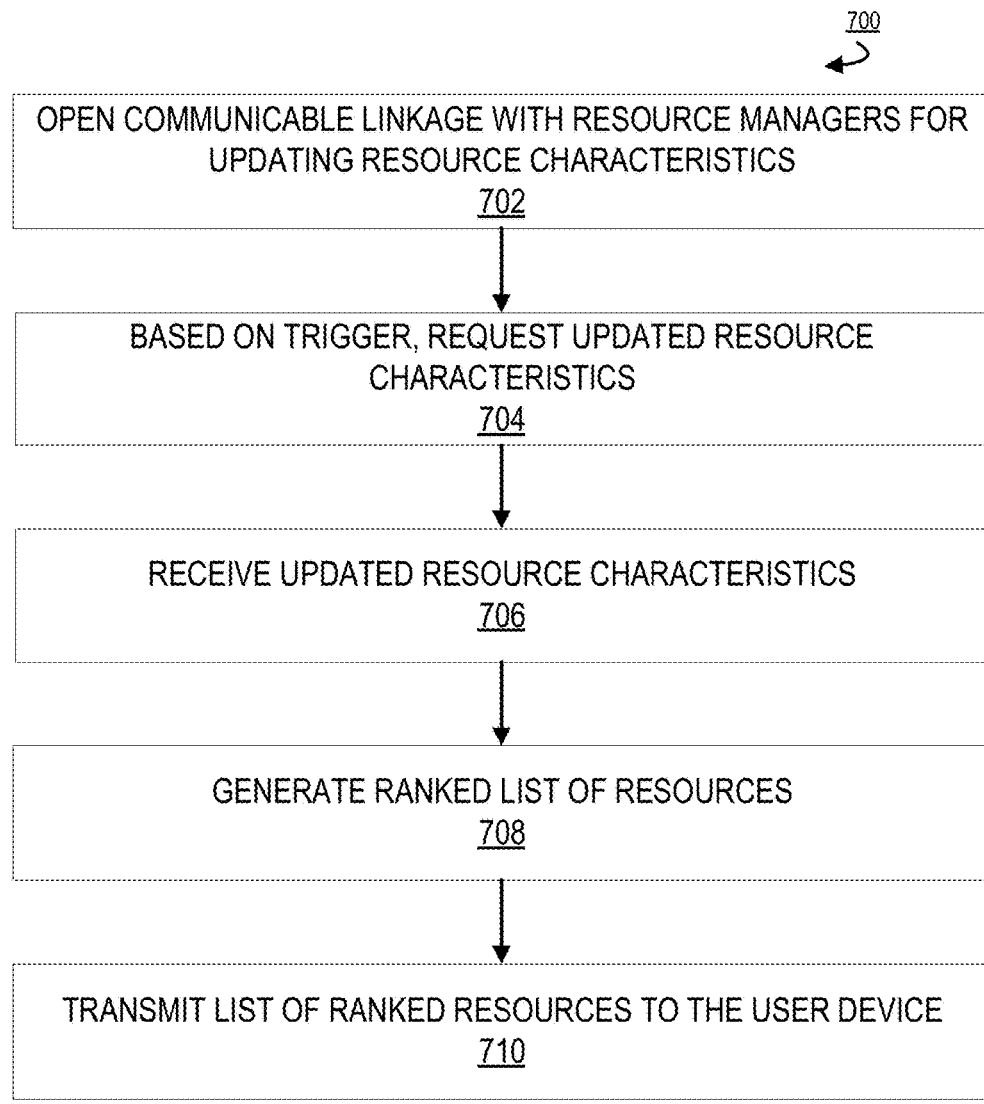
Figure 6:
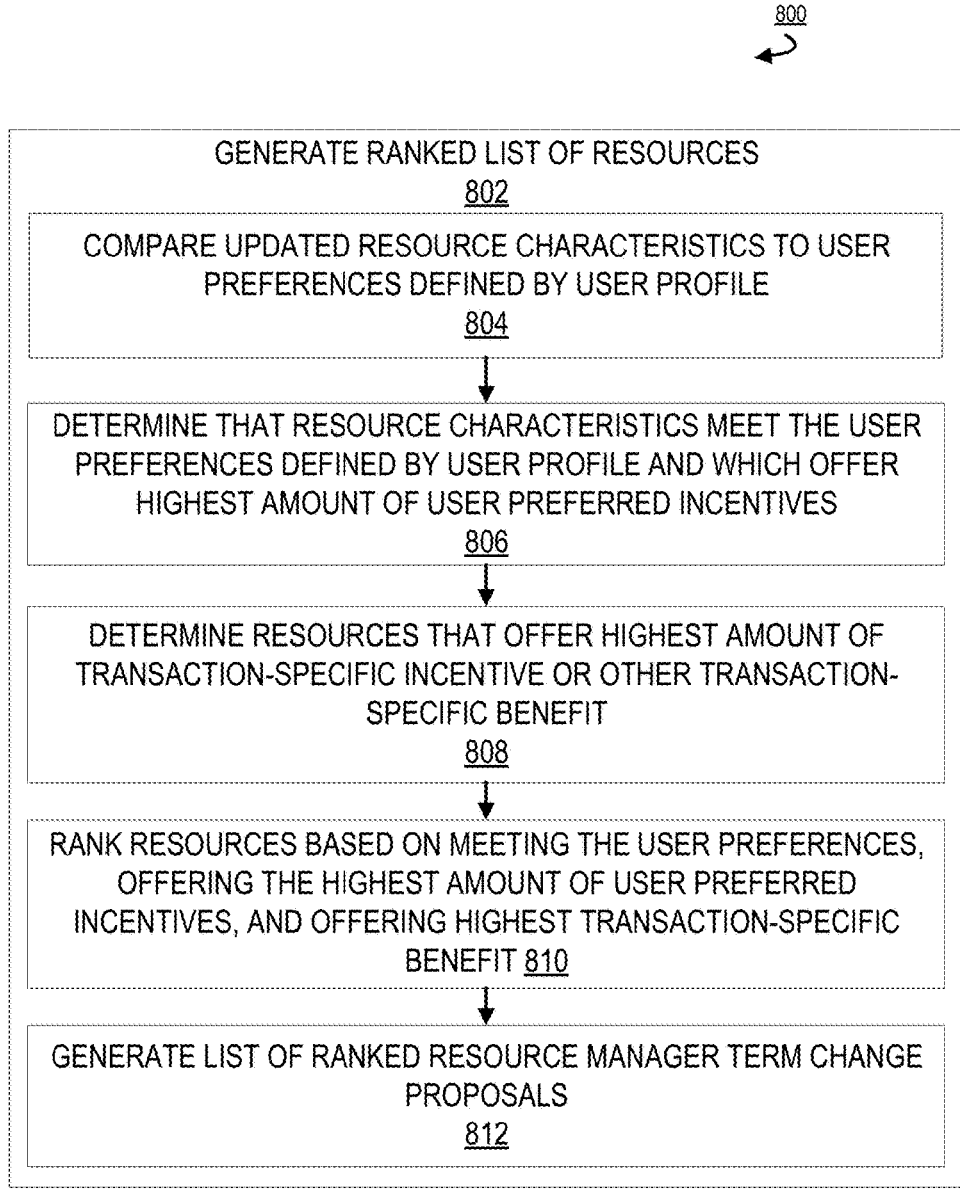
Figure 7:
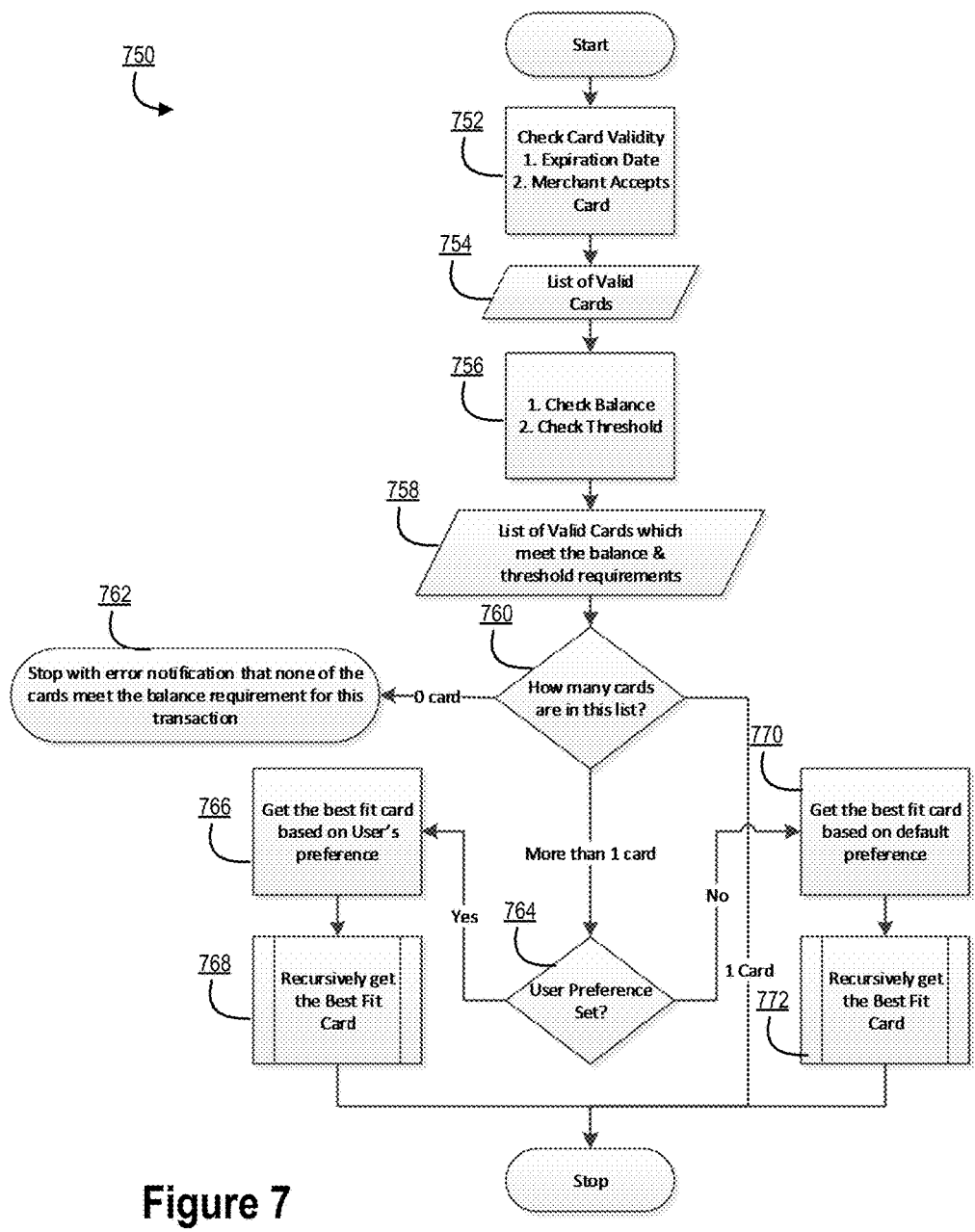
Figure 8:
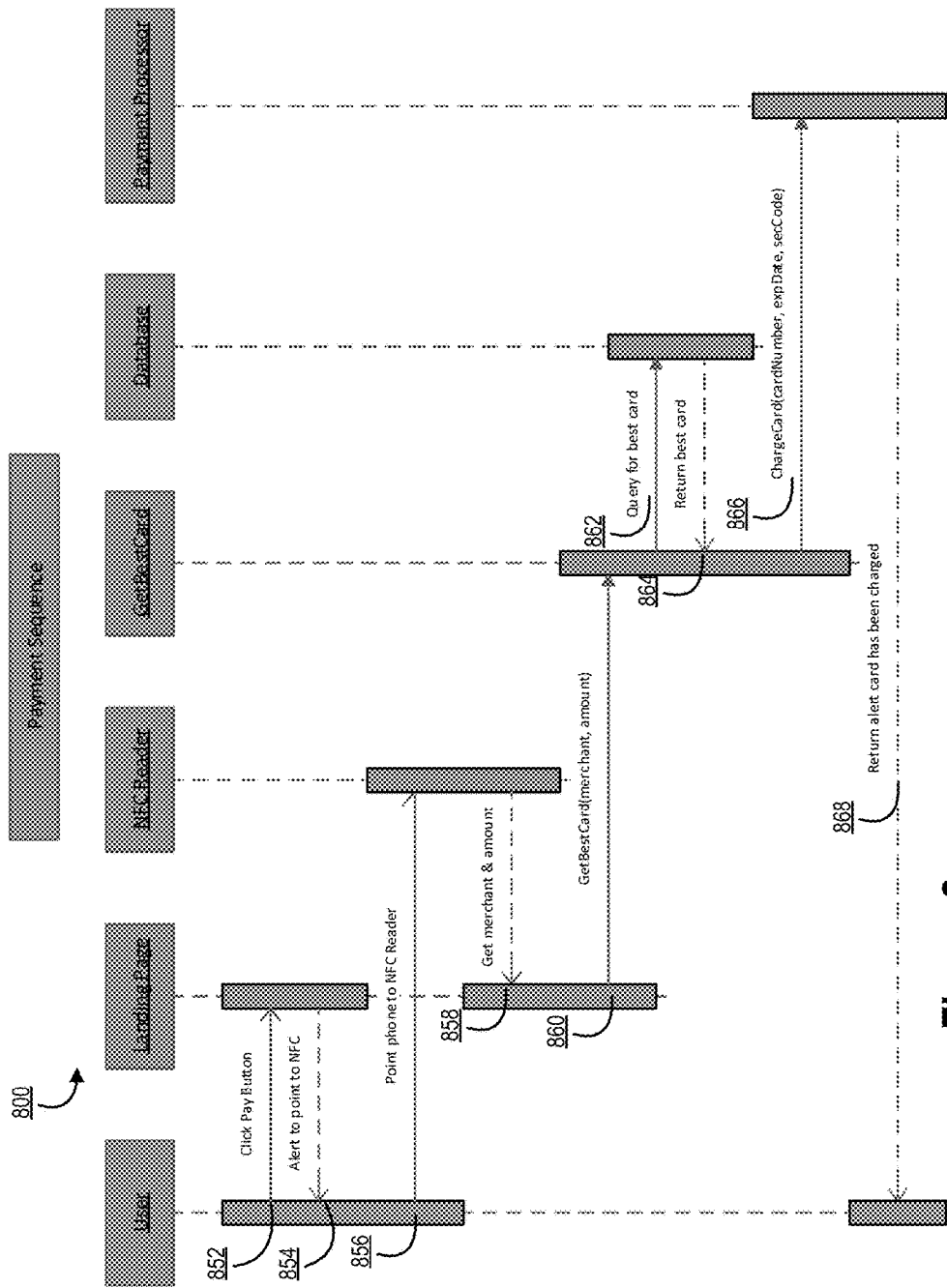
Figure 9:
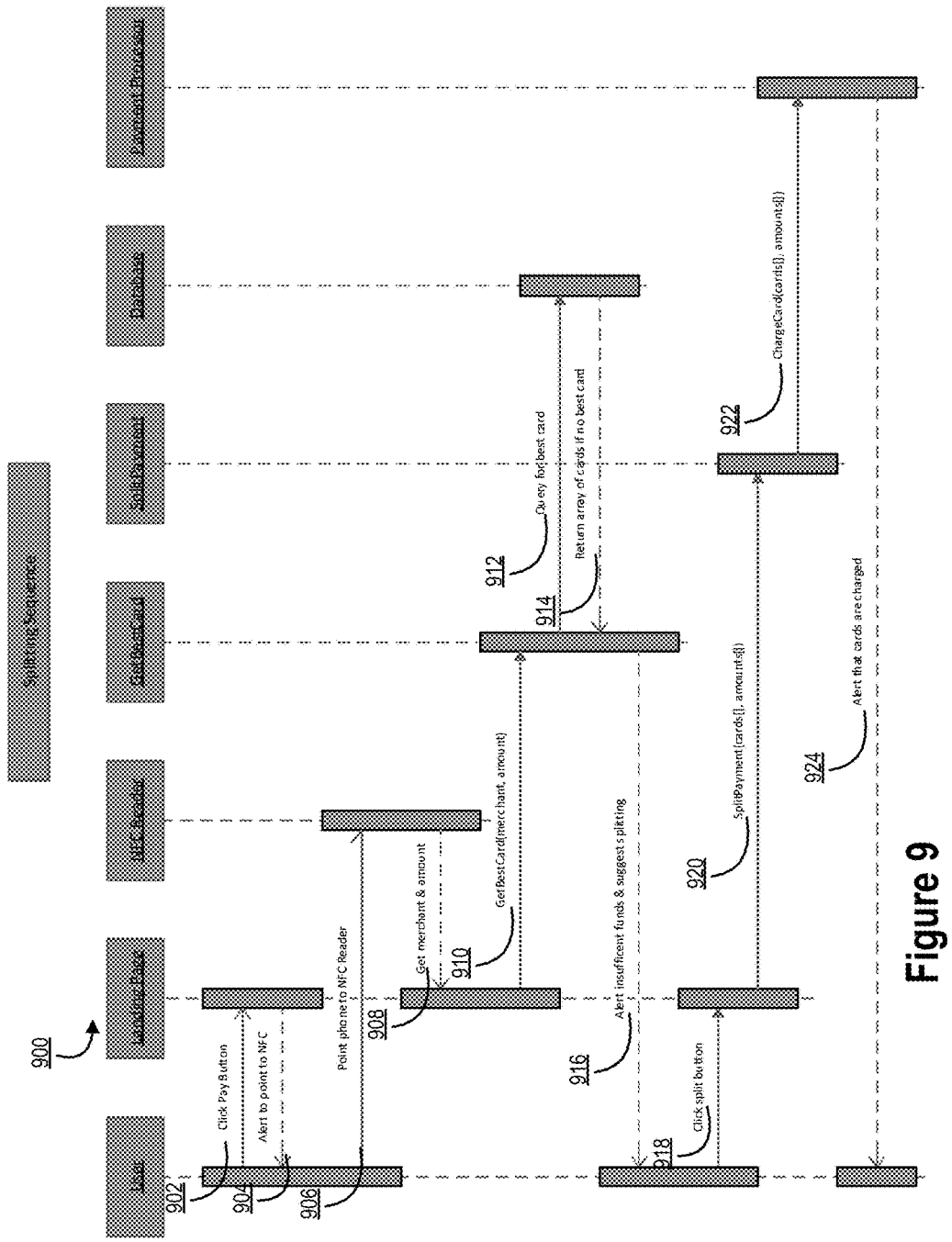
Figure 11:
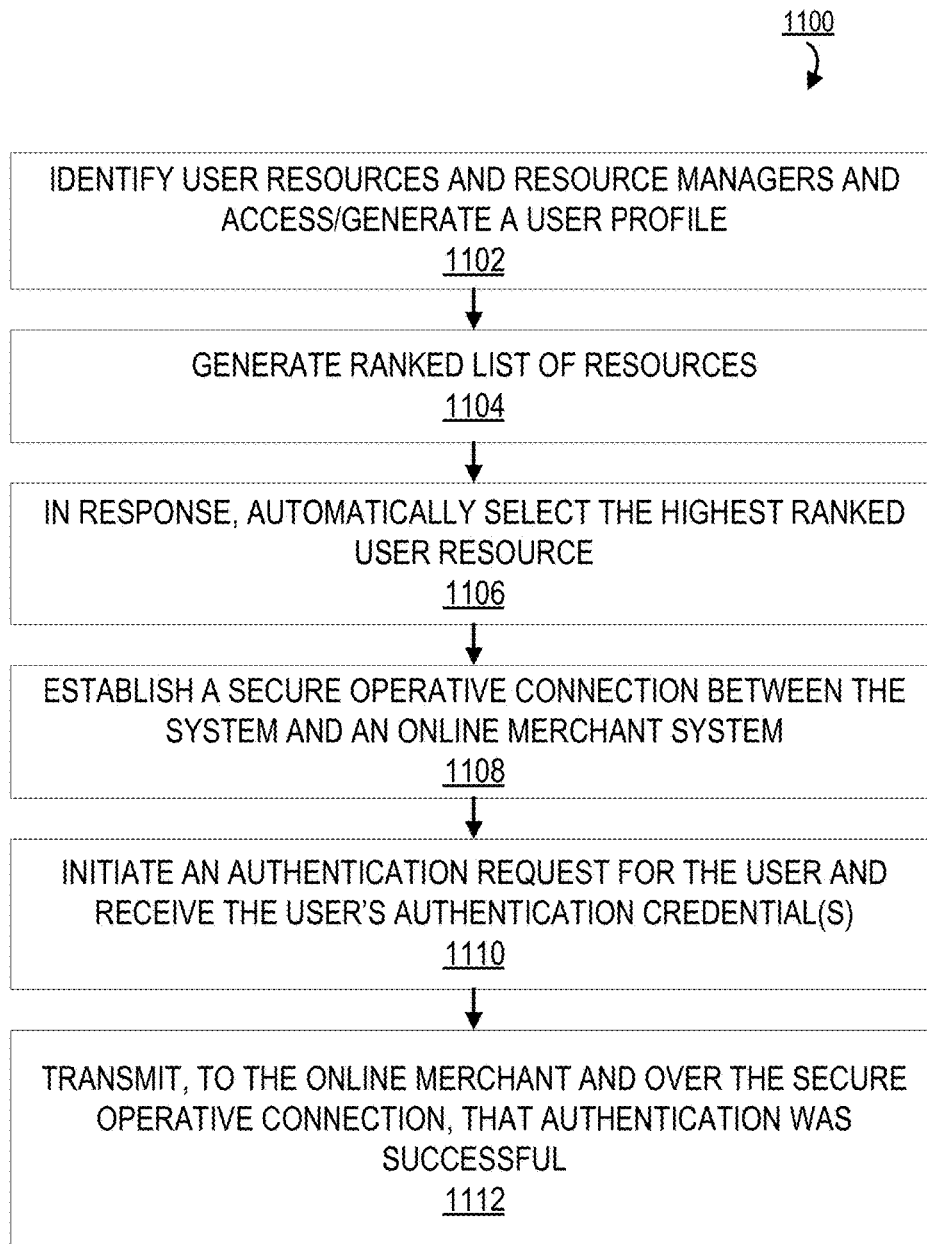
Figure 12:
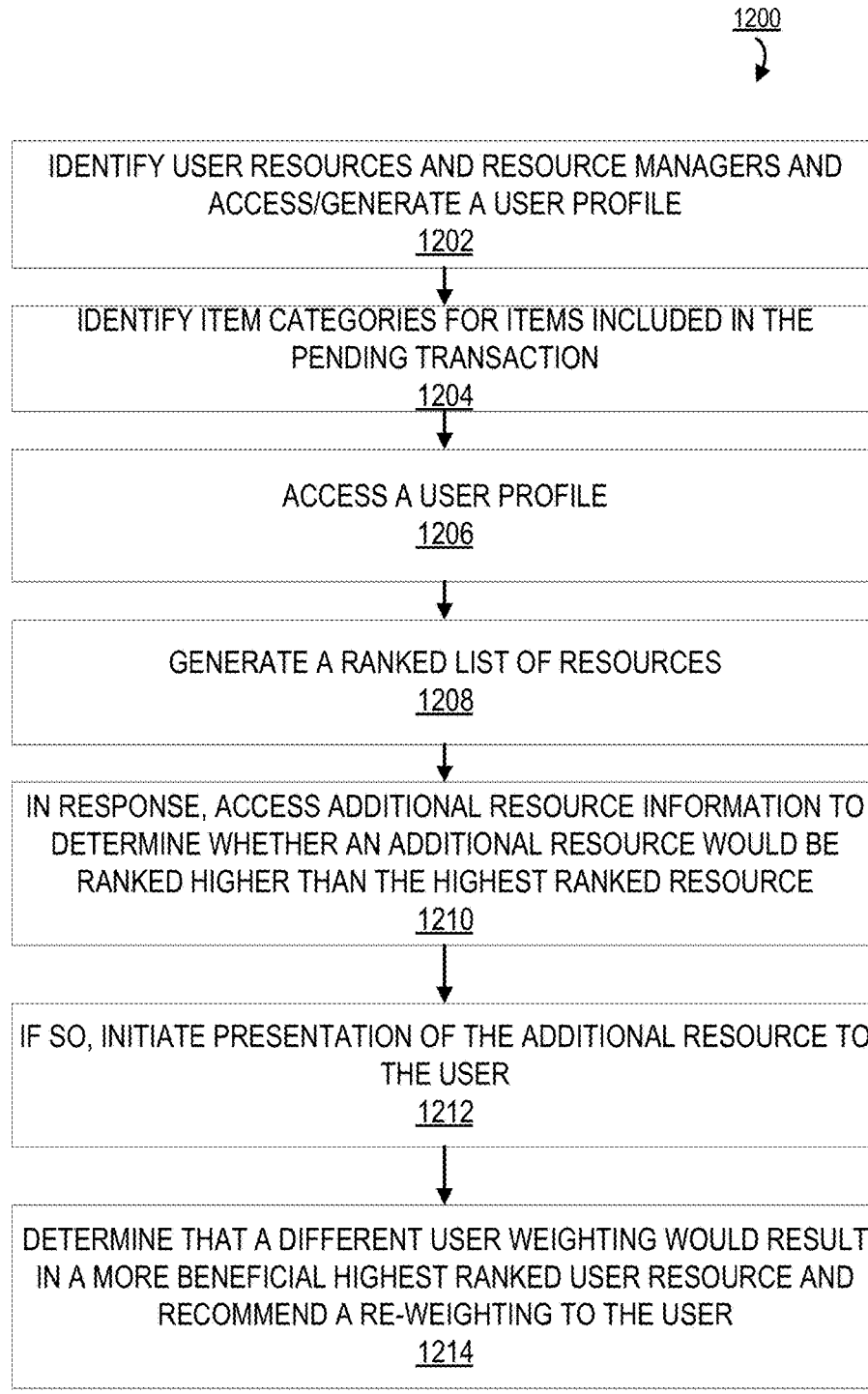

FIG. 3 provides a high level process flow illustrating implementation of a dynamic payment decisioning system, in accordance with embodiments of the invention;

FIG. 4 provides a high level process flow illustrating generation of a user profile, in accordance with embodiments of the invention;

FIG. 5 provides a high level process flow illustrating opening a communicable linkage with resource managers in detail, in accordance with embodiments of the invention;

FIG. 6 provides a high level process flow illustrating generating a ranked list of resources, in accordance with embodiments of the invention;

FIG. 7 provides a high level process flow illustrating available resource selection according to embodiments of the invention;

FIG. 8 provides a high level combined process flow and diagram illustrating payment sequence according to embodiments of the invention;

FIG. 9 provides a high level combined process flow and diagram illustrating a splitting sequence according to embodiments of the invention;

FIGS. 10A, 10B, 10C and 10D provide illustrations of screenshots of the user application running on a user device according to embodiments of the invention;

FIG. 11 provides a flowchart illustrating a method for dynamic resource selection and implementation for web-based transactions according to embodiments of the invention; and FIG. 12 provides a flowchart illustrating a method for dynamic intelligent resource selection and implementation according to embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Furthermore, as used herein the term "user device" may refer to mobile phones, personal computing devices, tablet computers, wearable devices, and/or any portable electronic device capable of receiving and/or storing data therein.

An "account" is the relationship that a user has with an entity, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, a non-monetary user profile that includes information associated with the user, or the like. The account is associated with and/or maintained by the entity. A "resource" is an account of the user, and/or a payment device associated with an account of the user. Examples of resources may be accounts that have cash or cash equivalents, a credit card and associated credit card account, a debit card and associated banking account, or accounts that are funded with or contain property, such as safety despots box account that jewelry, a trust account that is funded with property, or the like. In some embodiments, a "resource" may also be a goods or services provided by a manufacturer, business, and/or the like to the user.

A "transaction" refers to any communication between a user and the financial institution or other entity monitoring the user's activities. A transaction may refer to a physical or virtual purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

Embodiments of the present invention address the above needs and/or achieve other advantages by providing apparatuses (e.g., a system, computer program product and/or other device) and methods for providing a dynamic payment selection system. The present invention improves the process of a user selecting a resource to complete a transaction by enabling for selection of the resource that best matches a set of predetermined preferences and/or criteria at the time of a transaction. This may be done by building a selection profile among a variety of possible profiles appropriate for the purchase given details about the purchaser and the payment transaction. Additionally, the present invention enables resource managers the opportunity to potentially procure additional business by offering competitive, user-specific proposals in real-time.

More specifically, embodiments of the invention provide for using a mobile wallet to determine the best payment method at the time of purchase (i.e., during a mobile transaction with a merchant). The system determines the best payment method based on building a selection profile among a variety of possible profiles appropriate for the purchaser given details about the purchaser and the payment transaction itself. Some of the criteria for selecting the best payment method includes rewards opportunities, APR, spending limits (e.g., credit limits, user-implemented category spending limits, etc.), coupons and gift cards and user choices.

In various embodiments, the system may be leveraged to web browsers to favor online shopping, which may be performed on any user device including a workstation, desktop, tablet computer, mobile device or the like of the user. All sensitive data that includes user information and card information, and public data that includes deals will be stored locally on mobile devices or on secured servers. The data communication and synchronization between the mobile version and web version occur via end-to-end encryption when this invention is in use. When making a purchase online, the user can choose between the conventional store payment method and "pay with the app". "Pay with the app" enables users to complete the transaction with a single click. This web-based concept, in some embodiments, enables a browser plugin/extension running locally at the device with which the user is navigating the Internet merchant's website and at a checkout page of that online marketplace. When the user moves forward with an online marketplace transaction, the browser plugin/extension may be called and performs some or all the functionality described herein, including but not limited to, selecting a best resource for completing a transaction. In some embodiments, once the user makes a selection to utilize the web-based system described herein, by for example, clicking a "Pay with the app" button, additional authentication may be required at the device the user is using or, in some cases, at another device associated with the user, such as the user's mobile device. In some embodiments, for example, biometric authentication (e.g., fingerprint authentication) will be captured by the mobile device of the user, confirmation of which may then be forwarded across an operative connection between the mobile device and the device which the user is using (e.g., the user's desktop computer) to complete the transaction. Such authentication communication may be sent through one or more administrator systems or servers (such as a financial institution system) or may be sent over a secure communication channel over the Internet between the mobile device and the user's desktop.

In various other embodiments, the system can itemize transactions by item categories. Based on the user's shopping habits, the app can utilize item data and/or merchant category data to predict spending, recommend payment credentials (e.g., credit cards) that the users may like, and promote coupons/sales.

In some such embodiments, and based on the user's shopping habits, the application enables machine learning to fine-tune the user preferences. For example, if the user makes a lot of travel purchases, the application can suggest to the user that, within the credential selection system, the weighting (i.e., the rank) for rewards, that is, how much the rewards criterion is considered in the credential selection algorithm is weighted should be increased. Another example is if the user has heavy balances on his cards, then the application can recommend to the user to give APR a higher rank.

In various embodiments, a location-based decisioning process may be included in one or more of the dynamic payment decisioning processes described herein. For example, in some embodiments, a user may travel within a geographic region associated with a deal. As a more specific example, the user may be traveling outside his or her normal area of travel and the application may determine that a particular merchant in that area has a deal that may be attractive to the user. Although, in some cases, the user need not be outside her/his regular geographic region, but rather, may simply move inside a predetermined geographic region or location associated with the deal. This deal may be an exclusive deal negotiated with the provider of the dynamic payment decisioning system such that only users running the application 222 or a similar application would have access to the particular deal. The deal may be presented to the user as part of the dynamic payment decisioning process during a pending transaction or may be pushed to the user when the application 222 recognizes that the user is within the geographic area that qualifies for the deal. Once the user receives the deal, the user may "opt-in" to the deal and receive further information on the deal or the application 222 may automatically move forward with a transaction in response, for example, the application may automatically perform a purchase using the determined best resource for deal once the user confirms they would like to move forward with the deal.

Referring now to the Figures, FIG. 1 illustrates a dynamic payment decisioning system environment 200, in accordance with embodiments of the present invention. As illustrated in FIG. 1, the dynamic payment decisioning system 208 is operatively coupled, via a network 201 to the user device 204, a merchant point-of-transaction device 210, and one or more resource manager systems 206. In this way, the dynamic payment decisioning system 208 can send and receive information to and from the user device 204, the merchant point-of-transaction device 210, and the one or more resource manager systems 206. FIG. 1 illustrates only an example of an embodiment of the system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual or entity initiating a transaction for a product or service using a resource managed by a resource manager. In some embodiments, the user 202 may have a user device 204. FIG. 1 also illustrates a user device 204. The user device 204 may be, for example, a desktop personal computer, a mobile system, such as a cellular phone, smart phone, personal data assistant (PDA) wearable device, laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the one or more resource manager systems 206 and the dynamic payment decisioning system 208. As such, the communication device 212 generally comprises a modem, server, or other device for communicating with other devices on the network 201.

The user device 204 comprises computer-readable instructions 220 and data storage 218 stored in the memory device 216, which in some embodiments includes the computer-readable instructions 220 of a user application 222. In some embodiments, the user application 222 enables the user device 204 to dynamically select a resource for conducting a transaction, communicate with the merchant point-of-transaction device 210, and authorize the transaction for completion.

As further illustrated in FIG. 1, the dynamic payment decisioning system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the one or more resource manager systems 206, the merchant point-of-transaction device 210, and the user device 204. As such, the communication device 246 generally comprises a modem, server, or other device for communicating with other devices on the network 201.

As further illustrated in FIG. 1, the dynamic payment decisioning system 208 comprises computer-readable instructions 254 stored in the memory device 250, which in one embodiment includes the computer-readable instructions 254 of a dynamic payment decisioning application 258. In some embodiments, the memory device 250 includes data storage 252 for storing data related to the system environment 200, but not limited to data created and/or used by the dynamic payment decisioning application 258.

Embodiments of the dynamic payment decisioning system 208 may include multiple systems, servers, computers or the like maintained by one or many entities. FIG. 1 merely illustrates one of those systems that, typically, interacts with many other systems to form a cloud-based network. In one embodiment of the invention, the dynamic payment decisioning system 208 is operated by an entity that acts as a resource manager to the user. In some embodiments, the dynamic payment decisioning system 208 is operated by an entity that is separate or does not act as a resource manager, and in some embodiments, the user device 204 and the user application 222 operate independently during the real-time dynamic decisioning regarding resources for a transaction. In some cases, the user device 204 communicates with the dynamic payment decisioning system 208 initially and/or periodically in order to retrieve profiles related to the user and/or standard profiles that may be matched to the user-pending transaction combination such that the appropriate resource may be selected for the user-pending transaction combination.

The processing device 248 is configured to use the communication device 246 to gather data, such as data corresponding to user information, transactions, or resources offered by resource managers. The processing device 248 stores the data that it receives in the memory device 250.

In the embodiment illustrated in FIG. 1 and described throughout much of this specification, the dynamic payment decisioning application 258 may gather information related to the user and generate a user-specific profile, available resource profiles from resource managers, and create a ranked list of resources for completing a pending transaction.

In some embodiments, the dynamic payment decisioning application 258 identifies resources associated with the user 202. Furthermore, the dynamic payment decisioning application 258 may identify the resource managers that are responsible for maintaining, housing, or otherwise managing the resources associated with the user 202, for example, those resources that are included in a mobile wallet of the user device 204.

In some embodiments, the dynamic payment decisioning application 258 generates a user profile by first pushing a user profile to the user 202 in order to acquire user preferences. The dynamic payment decisioning application 258 sends a command signal to a user device 204 via a network 201 to display a graphical user interface comprising the user profile wherein the user profile comprises fields to be completed by the user 202. In some embodiments, the user profile is transmitted by the dynamic payment decisioning application 258 to a user device 204 associated with the user 202. The user profile is completed by the user 202, and upon completion, the user profile is transmitted, via a network 201, by the user device and received by the dynamic payment decisioning application 258. Subsequently, the user profile is processed by the dynamic payment decisioning application 258, wherein processing the user profile comprises extracting, compiling, and formatting user-inputted data so as to be presented via a graphical user interface.

In some embodiments, the dynamic payment decisioning application 258 uses information contained within the user profile to identify user accounts associated with available resources and one or more resource managers associated with the user accounts. The user accounts may be financial accounts such as a savings account, checking account, credit card account and/or the like. Account information such as account identifying numbers, credit card numbers, account manager and/or the like is obtained from the user profile completed by the user 202. In some embodiments, the user 202 on the user device 204 authorizes the dynamic payment decisioning application 258 to access the user accounts associated with the user 202 on the resource manager systems 206. The dynamic payment decisioning application 258 receives the account information associated with the user accounts directly from the one or more resource manager systems 206 via a network 201.

In various other embodiments, the user application 222 of the user device 204 determines the user accounts associated with the user by accessing the mobile wallet or multiple mobile wallets contained within the user device 204. In some embodiments, the user application 222 initiates formation of the user profile by accessing the mobile wallet(s) contained therein, and then supplements the user profile and/or confirms portions of the user profile by accessing the dynamic payment decisioning system 208 and/or the resource manager system 206.

In some embodiments of the invention, the dynamic payment decisioning application 258 may be maintained by a financial institution that also manages one or more accounts of the user 202, and the account information is already known by the financial institution without the user 202 needing to provide the account information in the user profile. In some embodiments, the user accounts may be nonfinancial accounts such as social media accounts, wherein the dynamic payment decisioning application 258 gathers nonfinancial information about the user 202 from a social media account profile associated with the user 202.

In some embodiments, the dynamic payment decisioning application 258 stores the user profile on a cloud network 301 as further illustrated in FIG. 2. In some embodiments, the cloud network is maintained by the dynamic payment decisioning application 258. In some embodiments, the network 201 is the cloud network. In other embodiments the dynamic payment decisioning application 258 stores the user profile in the memory device 250 of the dynamic payment decisioning system 208.

In some embodiments, the dynamic payment decisioning application 258 allows the user 202 to modify the user profile and/or portions of the user profile on the user device 204 associated with the user 202 ensuring that the user profile contains current user preferences, historic trends, and resources associated with the user 202. Upon request by the user 202, the user profile may be transmitted by the dynamic payment decisioning application 258 via a network 201 to the user device 204 or from the user application 222 via a network 201 to the dynamic payment decisioning system 208. Upon the user 202 updating the profile on the user device 204, the user profile may be transmitted back by the user device 204 and received by the dynamic payment decisioning application 258 and stored on the cloud network maintained by the dynamic payment decisioning application 258. In some embodiments of the invention, the user profile may be stored on the user device 204 and received by the dynamic payment decisioning system 208 upon the user 202 updating the user profile, which may then be transmitted to the dynamic payment decisioning system 208 in embodiments where the system 208 stores a copy of the user profile.

In some embodiments, the competitive proposal application 258 may automatically transmit the user profile to the user device 204 in response to a predefined period of user inactivity, wherein the dynamic payment decisioning system 208 prompts the user 202 to update the user profile and/or confirm that all user preferences, historic trends, and resources associated with the user 202 are current. Upon the user 202 updating and/or confirming the user profile, the user profile is transmitted via a network 201 by the user device 204 and received by the dynamic payment decisioning application 258.

Upon all items contributing to the total resource amount required by the merchant being scanned by the merchant, in some embodiments, the dynamic payment decisioning application 258 may receive from a merchant point-of-transaction device 210 a total resource amount required by the merchant for the transaction between the user 202 and the merchant at a merchant location. In some embodiments, the user device 204 communicates via radio frequency (RF) communication or some other wireless communication method with a merchant point-of-transaction device 210 and triggers a payment process. In response to the triggering of the payment process, the total resource amount is transmitted by the user device 204 over a network 201 and received by the dynamic payment decisioning application 258.

In some embodiments, the dynamic payment decisioning application 258 is triggered to establish a communicable linkage with the resource manager systems 206 in response to receiving the total resource amount required by the merchant for the transaction between the user 202 and the merchant at the merchant location. The communicable linkage between the resource manager systems 206 and the dynamic payment decisioning application 258 is established in order to acquire resource characteristics updates from the one or more resource managers, wherein the dynamic payment decisioning application 258 and the one or more resource manager systems 206 transmit and receive data from one another via a network 201 during the dynamic payment decisioning process.

The dynamic payment decisioning application 258 requires all systems and devices participating in the dynamic payment decisioning process to implement an application program interface (API) and an accessible cloud service with appropriate security capable of sending and/or receiving updates regarding resource characteristics. Resource characteristics may include terms regarding rewards, interest rates or the like associated with the resources.

In some embodiments, the user application 222 and/or the dynamic payment decisioning application 258 generates a ranked list of the resources associated with the user and available for use to complete the pending transaction. In some embodiments of the invention, generating a ranked list of resources includes analyzing the user preferences, wherein the user preferences include a preferred form of reward, incentive, and/or discount such as cash back, more reward points, lower interest rates, and/or the like provided to the user 202 by an associated resource relative to current terms set forth by the one or more resource managers upon selection of the associated resource to complete the transaction.

In some embodiments of the invention, generating a ranked list of the resources associated with the user includes generating a confidence score for each of the resources on the ranked list, wherein the confidence score comprises a confidence of the user employing a specific resource for providing the total resource amount to the merchant and completing the transaction. The confidence score is based on weighted factors, where the weighted factors may include in descending order of weight value: user preferences, past transaction data, historic trends, and/or location data associated with the user 202.

In embodiments where the dynamic payment decisioning application 258 determines the ranked list of resources, the dynamic payment decisioning application 258 transmits the ranked list of resources to the user device 204 associated with the user 202 via a network 201. The dynamic payment decisioning application 258 transmits a command signal to the user device 204 causing it to display a graphical user interface containing the ranked list of resources.

In some embodiments, the dynamic payment decisioning application 258 allows the user to select a resource from the ranked list of resources on the graphical user interface to provide the total resource amount to the merchant and complete the transaction. In some embodiments of the invention, the dynamic payment decisioning application 258 automatically selects a first resource on the ranked list and transmits the first resource to the merchant point-of-transaction device 210 via a network to complete the transaction. In other embodiments of the invention, the dynamic payment decisioning system 208 identifies a first resource on the ranked list of resources with a confidence score that meets or exceeds a predetermined confidence limit and transmits the first resource on the ranked list to the merchant point-of-transaction device 210 for providing the total resource amount to the merchant and completing the transaction.

In some embodiments, the dynamic payment decisioning application 258 transmits the ranked list of resources to the user device 204 associated with the user 202. The dynamic payment decisioning application 258 transmits a command signal to the user device 204 causing it to display a graphical user interface containing the ranked list of resources and allowing for the user 202 to select a resource from the ranked list and complete the transaction.

As illustrated in FIG. 1, the merchant point-of-transaction device 210 generally comprises a communication device 272, a processing device 274, and a memory device 276, wherein the processing device 274 is operatively coupled to the communication device 272 and memory device 276. Further, the memory device 276 comprises data storage 278 computer-readable instructions 280, which in some embodiments includes the computer-readable instructions 280 of a merchant application 282. The merchant point-of-transaction device 210 may use the communication device 272 to communicate over the network 201 with other systems and servers in the system environment 200, such as the user device 204, the resource manager systems 206, and the dynamic payment decisioning system 208. In some embodiments, the merchant application 282 allows the merchant point-of-transaction device 210 to communicate with the user device 204, and other systems in order to receive a resource for completion of a transaction and to complete the processing of the transaction.

The resource manager systems 206 generally includes a communication device 236, a processing device 238, and a memory device 240, where the processing device 238 is operatively coupled to the communication device 236 and memory device 240. Further, the memory device 240 comprises data storage 242 computer-readable instructions 244, which in some embodiments includes the computer-readable instructions 244 of a resource manager application 246. The resource manager systems 206 may use the communication device 236 to communicate over the network 201 with other systems and servers in the system environment 200, such as the user device 204, the merchant point-of-transaction device 210, and the dynamic payment decisioning system 208. In some embodiments, the resource manager application 246 allows the resource manager systems 206 to communicate with the dynamic payment decisioning system 208 in order to receive requests for and transmit updates to resource characteristics. The resource manager system 206 is associated with a resource manager that provides a resource with established terms to the user 202, wherein a resource is an account of the user, and/or a payment device associated with an account of the user such as accounts that have cash or cash equivalents, a credit card and associated credit card account, a debit card and associated banking account, and the like. In some embodiments, the resource manager may be a manufacturer, business, and/or the like, wherein a resource may be goods or services.

FIG. 2 illustrates a cloud-based dynamic payment decisioning system environment 300, in accordance with some embodiments of the invention. In some embodiments, a cloud network 301 is maintained and managed by the dynamic payment decisioning system 208. The cloud network 301 comprises the dynamic payment decisioning system 208, user device 204, merchant point-of-transaction device 210, and the resource manager systems 302. As illustrated in FIG. 1, in some embodiments, the cloud network can comprise one or more resource manager systems, wherein the one or more resource manager systems are operated and maintained by different resource managers. In other embodiments, a resource manager may provide multiple resource manager systems 302 to be included in the cloud network 301. Through the cloud network 301, the dynamic payment decisioning system 208 may transmit requests to the resource manager system(s) 302. In some embodiments, information can be stored and processed on the cloud network 301 instead of a local computing device such as the user device 204, where memory and processing capabilities of the local computing device remain unaffected.

In various embodiments of the invention, onboarding new resources such as new cards may be performed by taking pictures of the cards with the user device camera. Users may also manually input payment credential information into one or more mobile wallets. Alternatively, or in addition to this, the user application 222 may retrieve available resource information from at least four (4) sources, including user inputs, local repositories, remote repositories and/or vendor repositories.

The first source, user inputs, may be for example, in the format of a survey whereby the user is asked a series of questions regarding the resource such as payment terms, APR, billing cycle, personal preferences ranking the card against others in the wallet(s), etc. In some cases, first time users may be provided a tutorial explaining how to set and rank the preferences through the user device interface. Users may prioritize not only the main criteria (such as rewards, APR, spending limits, coupons, etc.), but also sub-criteria (such as cash back, frequent mileage, discounts, etc.). In some cases, when completing the survey, the users are timed and automatic selections are made after a predetermined period of time, but the users are typically given an opportunity to confirm or deny the automatic selections.

The second source is a local repository that may be stored on the user device itself. User are able to store coupons locally on the user application 222 by pulling electronic coupons from providers or by taking pictures of the coupons. A picture of a coupon is processed to populate the local repository with various terms of the coupon such as the expiration date, manufacturer, and participating merchant. This enables notification of coupon availability upon entering a participating merchant location where the coupon item is available. In some embodiments, the user application 222 or dynamic payment decisioning application 258 periodically offers discounts/coupons by pushing to those user devices 204 in a specific geographic area or otherwise and/or may also push messaging regarding available offers or coupons.

The third source is a remote repository on a system such as the dynamic payment decisioning system 208. In some embodiments, APIs are provided to expose the payment provider institutions (i.e., the resource managers), and the dynamic payment decisioning application 258 periodically retrieves currents terms and conditions (e.g., APR, payment terms, etc.) from the resource manager system(s) as discussed in further detail below. Such current terms may be stored locally at the user device 204 or remotely at the dynamic payment decisioning system 208 or otherwise. In some cases, the updated terms (also referred to herein as the resource characteristics) are stored as part of the user profile. In various embodiments, the dynamic payment decisioning application 258 will synchronize the user profile stored at the user device 204 each time the user application 222 starts, periodically or upon push notifications.

The fourth source is a vendor repository, which may provide information on resource features and rewards. In some cases, the dynamic payment decisioning system may purchase data from one or more vendor(s).

In various embodiments, the user application 222 and/or the dynamic payment decisioning application 158 can itemize transactions by item categories. For example, if a user buys kitchenware and electronics from a department store, the entire transactions should be categorized by the merchant code of the store. The application(s) 222 and/or 158 may be able to identify certain product categories within the transaction based on product information provided by the point of transaction device (or by other methods such as by scanning product UPC, taking a photo, etc.). Such information may be input into the resource selection algorithm for better selection of resources to be used to complete the transaction. In some cases, the application(s) 222 and/or 158 may utilize item and merchant category data to predict spending, recommend new products such as credit cards and promote coupons/sales. In other cases, the application(s) 222 and/or 158 may provide the item and merchant category data to merchants and/or resource managers (e.g., card issuing banks) for highly customized rewards or other card/merchant benefits.

In various embodiments, the preferences used by the resource selection algorithm may include rewards, APR, spending limits, coupons/gift cards and others, some or all of which may be overridden by the user's choice in some cases. Regarding rewards, cash back incentives may be associated with credit cards. For example, a bank may provide a percentage of a purchase back for a particular merchant category and a different percentage of the purchase back for a different merchant category and a different percentage back for all other merchant categories. Other rewards may be frequent mileage rewards such as every dollar spent is worth a particular number of miles. Discount rewards such as receiving a certain percentage off on a particular merchant category during a specified calendar range. Other rewards may include account opening rewards such as receiving cash when opening a new account and spending a certain amount within a specified period of time. The annual percentage rate (APR) for a payment instrument may be a traditional APR set by the issuing bank or may be a customized APR range such that the user can set the application(s) 222 or 158 to only choose the cards that have APR between a specified range, for example, between zero percent (0%) and five percent (5%). The spending limits may be bank-set limits or user-set limits on available credit. For example, the spending limits may be set to an eighty percent (80%) threshold of the total available credit on a specified cards or all cards in aggregate. Further, limits may be set based on item categories and/or merchant categories. For example, the user may set a limit of five hundred dollars ($500) on a particular merchant category or a limit of one hundred dollars ($100) on a particular type of item for a month. Coupons and giftcards may be stored as pre-paid coupons, store coupons and gift cards by the application(s) 222 or 158. The resource selection algorithm may look for coupons and gift cards and apply them automatically to the final total amount of the pending transaction. Some miscellaneous criteria may be considered as well, such as foreign transaction fees, rental car insurance coverage if the pending transaction is a rental car payment, extended warranties for particular products, etc. Finally, the user's choice may be considered. The user may, for example, manually override the resource selection algorithm's selection by setting a flag for a time to favor a particular resource or card. For example, the user may decide to promote a particular affinity over all other rewards/offers for a time period.

FIG. 3 provides a high level process flow for completing a transaction between a user and a merchant using a cloud-based dynamic payment decisioning system 100, in accordance with embodiments of the present invention. As illustrated by block 102, a dynamic payment decisioning system 208 identifies resources associated with the user 202. Furthermore, the dynamic payment decisioning system 208 may identify the resource managers that are responsible for maintaining, housing, or otherwise managing the resources associated with the user 202. In some embodiments of the invention, the one or more resource managers are financial institutions that provide and manage one or more credit cards, debit cards, lines of credit and/or the like to the user 202. In some embodiments, the resources are the one or more credit cards, debit cards, lines of credit and/or the like that the financial institutions provide to the user 202. For example, a resource manager may be a bank or a credit card company that provides and manages a credit card to the user 202.

In some embodiments, the one or more resource managers may be manufacturers of a product, wherein the resources are offers for products that the one or more manufacturers produce, wherein the offers could be discounts, coupons, and/or the like associated with the products. In some embodiments of the invention, the resource managers associated with the user 202 are identified by receiving communication from the user 202. In other embodiments, the resources associated with the user 202 are identified from accounts associated with the user 202 extracted and/or identified by the dynamic payment decisioning system 208.

As illustrated by block 104 of FIG. 3, the dynamic payment decisioning system 208 generates a user profile.

The generation of a user profile is further illustrated in FIG. 4. As illustrated in FIG. 4, which provides a process flow for generating a user profile 600, the dynamic payment decisioning system 208 generates the user profile in block 602 by first pushing a user profile to the user 202 in order to acquire user preferences as illustrated in block 604. The user profile comprises fields to be completed by the user 202. For example, the user profile may contain fields for user input such as a name, address, phone number, email address, social media account information, preferred form of reward or incentive, financial account information and/or the like. In some embodiments, the user profile is transmitted by the dynamic payment decisioning system 208 to a user device 204 associated with the user 202. The user profile is completed by the user 202, and upon completion, the user profile is transmitted and received by the system from the user device 204. Subsequently, the user profile is processed by the dynamic payment decisioning system 208, where processing the user profile comprises extracting, compiling, and formatting user-inputted data so as to be presented via a graphical user interface.

As illustrated by block 606 in FIG. 4, the dynamic payment decisioning system 208 processes the user profile and receives the user preferences, where the user preferences comprise preferences of the user 202 for a specific form of reward, incentive, and/or discount such as cash back, reward points, lower interest rates, and/or the like. For example, the user 202 may state in response to a prompt in the user profile that he/she prefers to receive cash back rather than reward points for a transaction. In some embodiments the form of reward could be a coupon, rebate, and/or the like provided by a manufacturer of a product for the product associated with the manufacturer that is included in the transaction between the user 202 and the merchant. For example, the user 202 may state in response to a prompt in the user profile that he/she prefers to receive a coupon that can be immediately applied to the transaction instead of a mail-in rebate.

As illustrated in block 608 in FIG. 4, the process 600 continues by identifying user accounts and resource managers associated with the accounts. As such, the dynamic payment decisioning system 208 uses information contained within the user profile to identify user accounts and one or more resource managers associated with the user accounts. The user accounts may be financial accounts such as a savings account, checking account, credit card account and/or the like. Account information such as account identifying numbers, credit card numbers, account manager and/or the like is obtained from the user profile completed by the user 202. For example, the user 202 may complete the user profile and provide information regarding a credit card associated with the user 202 and a credit card company that manages an account associated with the credit card. In some embodiments, the user 202 authorizes the dynamic payment decisioning system 208 to access the user accounts associated with the user 202, and the dynamic payment decisioning system 208 receives the account information associated with the user accounts directly from the one or more resource managers. In some embodiments of the invention, the dynamic payment decisioning system 208 may be maintained by a financial institution that also manages one or more accounts of the user 202, and the account information is already known by the financial institution without the user 202 needing to provide the account information in the user profile. In some embodiments, the user accounts may be nonfinancial accounts such as social media accounts, wherein the dynamic payment decisioning system 208 gathers nonfinancial information about the user 202 from a social media account profile associated with the user 202.

As illustrated in block 610 of FIG. 4, the dynamic payment decisioning system 208 extracts information contained within the user profile to identify historic trends associated with the user accounts. The system 208 may extract transaction purchase amounts, date and time of a transaction, location of a transaction, items included in a transaction and the like associated with a user account in order to identify historic trends.

Historic trends may include, for example, but are not limited to a proclivity of the user 202 for purchasing a specific brand of an item, a frequency that the user 202 shops at a merchant location, an average total amount of money spent by the user 202 while shopping at a merchant location, other behavioral tendencies of the user 202, and/or the like. For example, the dynamic payment decisioning system 208 may recognize from past transactions associated with a user account that the user 202 has travelled a certain number of times over a time period and associate a tendency to travel with the user 202. In some embodiments, wherein the user account is a social media account, the dynamic payment decisioning system 208 may identify trends from a social media account associated with the user 202 by recognizing words or phrases frequently employed by the user 202, wherein the words or phrases may be a product brand name, a merchant name or location, and/or the like. The dynamic payment decisioning system 208 may also identify trends from the social media account associated with the user 202 by recognizing pages on a social media platform associated with the social media account that have been made favorite by the user 202. For example, the dynamic payment decisioning system 208 may identify a proclivity of the user 202 for a certain brand of a product by recognizing that the user 202 "liked" the page on the social media platform associated with the certain brand of the product.

As illustrated in block 612 of FIG. 4, the dynamic payment decisioning system 208 uses collected information associated with the user 202 to generate a user profile for the user 202 based on the user preferences, historic trends, and the one or more resources available to the user 202.

As seen in block 614 of FIG. 4, the process 600 continues by storing the user profile on a cloud network 301 as seen in FIG. 2. In some embodiments, the cloud network 301 is maintained by the dynamic payment decisioning system 208. Access to the user profile may be provided, in some embodiments, to one or more of the resource manager systems 206 by the dynamic payment decisioning system 208 allowing the one or more resource managers access to the user preferences and historic trends associated with the user 202 in order for the one or more resource managers to offer competitive resource characteristics that may be seen as attractive to the user 202. In some embodiments of the invention, the user profile or specified portions of the user profile is/are transmitted to the one or more resource managers and stored on the resource manager systems 206, where user profiles stored on the resource manager system 206 are updated in real time by the dynamic payment decisioning system 208 as new information associated with the user becomes available to ensure that the one or more resource managers are able to provide competitive resource characteristics that may be seen as attractive to the user 202 based on recent information associated with the user 202. In other embodiments, aspects of the user profile is kept private from the resource managers. The dynamic payment decisioning system 208 may not allow the resource managers to access the user preferences and instead matches the user profile to received offers and/or resource characteristics from the resource managers.

In some embodiments, the user profile is made available to the resource manager systems 206 solely for the purpose of the resource managers updated the applicable resource characteristics stored as part of the user profile. Once the user profile has received updated resource characteristics, then the dynamic payment decisioning system 208, in some embodiments, may send the updated user profile to the user device concurrently with instructions causing the user device to replace an old version of the user profile with the updated version of the user profile. In some embodiments, only updated portions of the user profile are transmitted from the dynamic payment decisioning system 208 to the user device 204 for replacement in the user profile stored by the user device 204.

As illustrated in block 616 of FIG. 4, the dynamic payment decisioning system 208 enables the user 202 to modify the user profile on the user device 204 associated with the user 202 ensuring that the user profile contains current user preferences, historic trends, and resources available to the user 202. Upon request by the user 202, any updates to the user profile may be transmitted by the dynamic payment decisioning system 208 to the user device 204. Upon the user 202 updating the user profile on the user device 204, the user profile may be transmitted by the user device 204 concurrently with instructions causing the dynamic payment decisioning system 208 to update its copy of the user profile. These instructions and the updated user profile may be received by the dynamic payment decisioning system 208 and stored on the cloud network 301 maintained by the dynamic payment decisioning system 208. In other words, in some embodiments of the invention, the user profile may be stored on the user device 204 and received by the dynamic payment decisioning system 208 upon the user 202 updating the user profile, where the user profile with the current user preferences, historic trends, and resources available to the user 202. In some embodiments, the dynamic payment decisioning system 208 may automatically transmit the user profile to the user device 204 in response to a predefined period of user inactivity, wherein the dynamic payment decisioning system 208 prompts the user 202 to update the user profile and/or confirm that all user preferences, historic trends, and resources available to the user 202 are current. Upon the user 202 updating and/or confirming the user profile, the user profile may be transmitted from the user device 204 and received by the dynamic payment decisioning system 208, where some or all the user profile with the current user preferences, historic trends, and resources available to the user 202 may be provided to the resource manager systems 206 for regular updating of resource characteristics.

Referring back to FIG. 3, as illustrated in block 106, after generating the user profile 104, the process 100 continues by receiving at the dynamic payment decisioning system 208 from the user device 204 a total resource amount required by the merchant for the transaction between the user 202 and the merchant at a merchant location. Upon all items contributing to the total resource amount required by the merchant being scanned by the merchant, the user device 204 communicates with a merchant point-of-transaction device 210 and triggers a payment process. In response to the triggering of the payment process, the total resource amount is received by the dynamic payment decisioning system 208 from the user device 204 via network communication. In some embodiments of the invention, the communication between the user device 204 and the merchant point-of-transaction device 210 may be a wireless radio frequency (RF) communication or other wireless communication method.

In various other embodiments, the total resource amount required by the merchant for the transaction between the user 202 and the merchant is communicated from the merchant to the dynamic payment decisioning system 208 without being passed through the user device, that is, it is communicated over the network 201. In some embodiments, the total resource amount required for the transaction is not communicated to the dynamic payment decisioning system 208, but rather, it is processed solely by the user device 204 to select and implement the appropriate resource for the transaction.

As illustrated in block 108 of FIG. 3 the dynamic payment decisioning system 208 is triggered to establish a communicable linkage with the resource manager systems 206 in response to receiving the total resource amount required by the merchant for the transaction between the user 202 and the merchant at the merchant location. The communicable linkage between the resource manager systems 206 and the dynamic payment decisioning system 208 is established in order to acquire updated resource characteristics from the one or more resource managers, where the updated resource characteristics may include changes to pre-established payment terms between the user 202 and the one or more resource managers such as interest rates, amount of cash back earned by the user 202, amount of reward points earned by the user 202, and/or the like. For example, a resource manager may propose to the user 202 a lower interest rate for the transaction relative to a pre-established interest rate in return for the user 202 choosing to complete the transaction using a credit card associated with the resource manager.

In some embodiments where the resource selection and implementation process is not conducted solely on the user device 204, the dynamic payment decisioning system 208 may require some or all the systems and devices participating in the process to implement an application program interface (API) and an accessible cloud service with appropriate security capable of sending and/or receiving transmissions by a manager of the resources.

As illustrated in block 112, the dynamic payment decisioning system 208 and/or the user device 204 generates a ranked list of the resources associated with the user. In some embodiments of the invention, generating a ranked list of resources available to the user includes analyzing the user preferences, where the user preferences include a preferred form of reward, incentive, and/or discount such as cash back, more reward points, lower interest rates, and/or the like provided to the user 202 by an associated resource relative to current terms set forth by the one or more resource managers upon selection of the associated resource to complete the transaction. For example, if the user profile states that the user 202 prioritizes lower interest rates over cash back, the dynamic payment decisioning system 208 will rank a resource that provides a lower interest rate over a resource that provides cash back.

In some embodiments of the invention, generating a ranked list of the resources available to the user includes generating a confidence score for each of the resources on the ranked list, where the confidence score includes a confidence of the user employing a specific resource for providing the total resource amount to the merchant and completing the transaction. The confidence score is based on weighted factors, where the weighted factors may include in descending order of weight value: user preferences, past transaction data, historic trends, and/or location data associated with the user 202.

As illustrated in block 114, in embodiments where the process is not being performed solely by the user device 204, the dynamic payment decisioning system 208 transmits the ranked list of resources to the user device 204 associated with the user 202. The dynamic payment decisioning system 208 transmits a command signal to the user device 204 causing it to display a graphical user interface containing the ranked list of resources.

As illustrated in block 116, the dynamic payment decisioning system 208 and/or the user device 204 enables the user to select a resource from the ranked list of resources to provide the total resource amount to the merchant and complete the transaction. In some embodiments of the invention, the dynamic payment decisioning system 208 or the user device 204 automatically selects a first resource on the ranked list and completes the transaction. In some embodiments of the invention, the dynamic payment decisioning system 208 or the user device 204 identifies a first resource on the ranked list of resources with a confidence score that meets or exceeds a predetermined confidence limit and transmits the first resource on the ranked list to the merchant for providing the total resource amount to the merchant and completing the transaction. In embodiments where the dynamic payment decisioning system 208 selects the resource, it may either (i) send the resource to the merchant via the user device by instructing the user device to establish an operative connection with the point of transaction of the merchant or (ii) by sending the resource to the merchant over a secure established communication rail via the network 201.

In some embodiments of the invention, the merchant may be allowed to participate in a payment selection and implementation process as described herein by incentivizing the user 202 to complete the transaction through a real-time, direct transfer of cash to a financial account associated with the merchant from a financial account associated with the user 202, where third party resource managers are not required to participate in the transaction. By not including the third party resource managers, the merchant is able to avoid any potential processing fees associated with the third party resource managers, and cost of completing the transaction for the merchant is reduced. Additionally, risk of crime for the merchant such as robbery is reduced as all cash is transferred electronically and not located at the merchant location. In some embodiments, the merchant may incentivize the user 202 to complete the transaction through the real-time, direct transfer of cash by offering a discount to the total resource amount required by the merchant, in-store credit, gift cards and/or the like. In some embodiments, the merchant's depository information is transmitted directly to the dynamic payment decisioning system 208 by the merchant point-of-transaction device 210, while in another embodiment, the user device 204 receives the merchant's depository information from the merchant point-of-transaction device 210 and transmits the information to the dynamic payment decisioning system 208. In some embodiments, the communication between the user device 204 and the merchant point-of-transaction device 210 may be accomplished through near-field communication (NFC) or other wireless communication technology.

In some embodiments, the merchant may be notified by the dynamic payment decisioning system 208 of the terms of the pending transaction and/or the resources available to the user and/or the corresponding resource characteristics available to the user 202. In some such embodiments, the merchant may provide additional or alternative incentives to the user, through the user device 204 and/or the dynamic payment decisioning system 208 for completion of the transaction via a merchant-specific resource or resource available to the user that otherwise benefits the merchant in some way. In other embodiments, the merchant is unaware of the terms of the pending transaction and/or the resources available to the user and/or the corresponding resource characteristics available to the user 202.

In some embodiments of the invention, the one or more resource managers comprise one or more manufacturers of competing products similar to a product to be included in the transaction, wherein the ranked list of resources comprises a ranked list of product proposals from the one or more manufacturers of the competing products similar to the product to be included in the transaction between the user 202 and the merchant. Upon identifying the product has been selected by the user 202 to be included in the transaction, the dynamic payment decisioning system 208 may generate the ranked list of product proposals from the one or more manufacturers of competing products similar to the product to be included in the transaction.

FIG. 5 provides a process flow for requesting, receiving, and transmitting updated resource characteristics from the resource managers 700. As illustrated in block 702, the dynamic payment decisioning system 208 is triggered to establish a communicable linkage with the resource manager systems 206 periodically, regularly, or in response to some trigger, such as receiving the total resource amount required by the merchant for the transaction between the user 202 and the merchant at the merchant location. The communicable linkage between the resource manager systems 206 and the dynamic payment decisioning system 208 is established in order to acquire updated resource characteristics from the one or more resource managers, where the updated resource characteristics may include changes to pre-established payment terms between the user 202 and the one or more resource managers such as interest rates, amount of cash back earned by the user 202, amount of reward points earned by the user 202, and/or the like. In some embodiments, the one or more resource managers are manufacturers of a competing product similar to a product to be included in the transaction, wherein the updated resource characteristics are proposed price changes, discounts, coupons, rebates and/or other like incentives for a product offered by a manufacturer of a product in return for including the product in the transaction.

As illustrated in block 704 of FIG. 5, based on the triggering the establishment of the communicable linkages with the resource manager systems 206, the dynamic payment decisioning system 208 requests updating of the resource characteristics for the resources available to the user 202. In some embodiments, the dynamic payment decisioning system 208 enables the one or more resource managers to access the user profile stored in the cloud and to use the information contained within the user profile to offer attractive and competitive proposals to the user 202. In some embodiments of the invention, the dynamic payment decisioning system 208 also requests offers from one or more resource managers not associated with the user 202 to compete with the other resource characteristics associated with the user 202. For example, the dynamic payment decisioning system 208 may request an offer for terms associated with a new credit card from a credit card company not already associated with the user 202 to compete with the term changes provided by credit card companies already associated with the user 202, wherein the user 202 may sign-up for the new credit card and complete the transaction with the new credit card.

As illustrated in block 706 of FIG. 5, the dynamic payment decisioning system 208 receives the updated resource characteristics transmitted from the one or more resource managers. In some embodiments of the invention, receiving the updated resource characteristics from the one or more resource managers through the communicable linkage between the dynamic payment decisioning system 208 and the resource manager systems 206 comprises a confidential bidding process, wherein the one or more resource managers submit a single, private term change proposal for a resource associated with the user 202 for completing the transaction between the user 202 and the merchant. The one or more resource managers are unaware of offers proposed by competitor resource managers during the competitive proposal process. In some embodiments, receiving the term change proposals from the one or more resource managers through the communicable linkage between the dynamic payment decisioning system 208 and the resource manager systems 206 comprises a public auction, wherein, after offering initial term change proposals, the one or more resource managers may be notified of a currently pending term change proposal from a competitor resource manager. In response, the one or more resource managers not offering the currently pending term change proposal for completing the transaction between the user 202 and the merchant and providing the total resource amount to the merchant may offer additional term change proposals to compete with the currently pending term change proposal.

As illustrated in block 708, the dynamic payment decisioning system 208 generates a ranked list of the resources associated with the term change proposals from the one or more resource managers.

FIG. 6 further illustrates the process of generating a ranked list of resources provided by the one or more resource managers 800, where the process is used to generate the ranked list as seen in block 802. The process begins with the dynamic payment decisioning system 208 or user device 204 comparing updated resource characteristics to the user preferences contained within the user profile as seen in block 804. As illustrated in block 806, the system 208 or user device 204 attempts to match the user preferences with resource characteristics defined in the user profile such that the match would provide the highest amount of user preferred incentives. After determining a match, the dynamic payment decisioning system 208 or the user device 204 in block 808 determines the resources that offer the highest amount of transaction-specific incentive or other transaction-specific benefit based on the user preferences. Steps 806 and 808 may be performed concurrently such that the transaction parameters may be considered during determination of which resource provides the highest amount of user preferred incentives for the specific transaction. For example, if the user 202 specified a preference for a rebate on a product as a preferred form of incentive, the system 208 will determine the available resource that provides the highest rebate amount. As illustrated in block 810, based on comparing the available resource characteristics with the user preferences and determining which matched resource offers the highest amount of user-preferred incentive, the dynamic payment decisioning system 208 or user device 204 ranks the available resources and subsequently generates a list of the ranked available resources as illustrated in blocks 810 and 812 respectively.

In some embodiments of the invention, generating a ranked list of resources from the one or more resource managers further comprises analyzing the user preferences, wherein the user preferences include a preferred form of reward, incentive, and/or discount such as a lower price, a rebate, a coupon, and/or similar offers provided to the user by a manufacturer of a competing product upon selection by the user to include the competing product in the transaction. For example, if the user profile states that the user 202 prioritizes a lower price over a rebate, the dynamic payment decisioning system 208 will rank a resource that provides a lower price over a resource that provides a rebate.

In some embodiments of the invention, generating a ranked list of the resources associated with the available resources comprises generating a confidence score for each of the resources on the ranked list, where the confidence score comprises a confidence of the user selecting a specific product to include in the transaction and is based on weighted factors. The weighted factors may include in descending order of weight value: user preferences, past transaction data, historic trends, and/or location data associated with the user. Based on generated confidence scores for the available resources, the dynamic payment decisioning system 208 or user device 204 may identify a first available resource on the ranked list of available resources that possesses a confidence score that meets or exceeds a predetermined confidence limit. The first available resource on the ranked list of available resources may be transmitted to the user device 204 if this processing is performed by the dynamic payment decisioning system 208.

In some embodiments of the invention, the dynamic payment decisioning system 208 transmits an in-store location of a first product associated with the first product proposal to the user device 204 with the first product proposal. For example, the user 202 may choose a first brand of milk to be included in the transaction between the user 202 and the merchant. Upon identification that the user 202 has selected the first brand of milk, the dynamic payment decisioning system 208 may determine whether a product from manufacturers of other brands of milk in competition with the first brand provides differing incentives when associated with the various resources available to the user for completing the transaction. The dynamic payment decisioning system 208 or user device 204 may generate a ranked list of the product proposals from the manufactures of the other brands of milk and generate confidence scores for each of the product proposals. Based on the ranked list and the confidence scores, the dynamic payment decisioning system 208 or user device 204 may transmit a first product proposal and in-store location for a second brand of milk to the interface of the user device 204, where there may be an incentive to add the second brand of milk to the transaction instead of the first brand of milk such as a lower price, a discount, and/or the like.

Similarly, given the brands of products being purchased, the dynamic payment decisioning system 208 or user device 204 may analyze the incentive/benefits for purchasing those particular products using each of the available resources to determine whether any product-specific benefits exist and, upon doing so, aggregate the benefits for each of the available resources to generate the ranked list of available resources.

Referring back to FIG. 5, as illustrated in block 710, the dynamic payment decisioning system 208 or user device 204 transmits the ranked list of resources to the interface of the user device 204 associated with the user 202. In some embodiments, the dynamic payment decisioning system 208 transmits a command signal to the user device 204 causing it to display a graphical user interface containing the ranked list of resources.

Referring now to FIG. 7, a flowchart illustrates a method 750 for dynamic payment selection and implementation according to some embodiments of the invention. As discussed above, the algorithm for selecting the best resource available to the user takes in two parameters in some embodiments—the merchant identity and the transaction amount. Using these parameters, the algorithm may go through a series of steps to assign values to a set of payment methods and then determines the best possible payment method. First, the algorithm determines the category of the merchant based on merchant information and a datastore mapping merchant information to merchant categories. Then, based off the merchant category and a datastore of payment credentials (e.g., payment cards) accepted by particular merchants, the system determines which payment credentials are eligible. From this subset of payment credentials, the system checks if the card is expired. Concurrently, the system checks to see if the payment credential's balance is sufficient to cover the transaction amount. Then, the system receives a subset of valid payment methods that can be used for the particular transaction.

The next step is for the system to calculate relative importance of different payment credentials according to the preferences of the particular user. From a set of features of the different payment methods (e.g., rewards, APR, balance, etc.), the system enables the user to rank the relative importance of each of the features during the initial setup of the application, or in some cases, whenever particular values change and need updating. The system then uses the relative importance of a card feature to give each feature weight. The system then calculates a score for each of the features using the corresponding weight of the relative importance of the feature.

More specifically, and referring back to FIG. 7, the first step of method 750 represented by block 752 is for the dynamic payment decisioning system 208 or user device 204 to check card validity including to ensure the card has not expired and that the merchant associated with the pending transaction accepts the card, which results in a list of valid cards, as represented by block 754. Next, as represented by block 756, the system 208 or user device 204 checks the balance on the cards and any thresholds associated with the cards, which results in a list of valid cards that meet the balance and threshold requirements for the transaction, as represented by block 758. Next, the system 208 or user device 204 notes how many cards are on the list, as represented by block 760, and in the case zero (0) cards are on the list, the process stops and, in some embodiments, provides an error notification that none of the cards meet the requirements for the transaction (and in some cases note the failed requirement such as not meeting the balance requirement for the transaction), as represented by block 762. If there is one (1) card on the list, then the process stops and that card is selected. If there are more than one (1) card on the list, then the next step is to determine if user preferences exist, as represented by block 764. If not, then the next step is to select the best card based on default system preferences, as represented by block 770. The default system preferences may weight certain features highly, such as the card that provides the best standardized rewards or the card that provides the lowest APR. Next, as represented by block 772, the system 208 or user device 204 recursively selects the best fit card for a particular preference. As shown in block 766, if the user has set a preference, then the system 208 or user device 204 selects the best fit card based on the user's preference and then recursively finds the best fit card for any other preferences being considered in the selection, as represented by block 768. In other words, if more than one preference is being used in the selection process, then the process steps through each of the preferences to determine the best card for that particular preference (regardless of whether the user has set the preference or whether it is a default preference). Once all the preferences being used in the selection process have been considered, then, in some embodiments, the preferences are weighted based on user selected weightings or based on default weightings and each of the available cards are ranked in a list of available cards.

Referring now to FIG. 8, a combined diagram and flowchart illustrates a payment sequence process 800 according to embodiments of the invention. The first step is for the user to select a pay button on the user device 204, as represented by arrow 852. In case the user device is not oriented properly with regard to the point of transaction device, a landing page interface then alerts to point to the point of transaction terminal (such as an NFC device) as represented by arrow 854. Then, as represented by arrow 856, the user points the user device 204 toward the NFC reader (or manipulates the user device in relation to the point of transaction device as necessary for establishing an operative connection between the user device and the point of transaction device). The NFC reader then gets the merchant and amount of the transaction from a merchant device, as represented by arrow 858. As represented by arrow 860, the "get best card" algorithm (embodiments of which were described above with reference to FIG. 7) is called and executed. The algorithm send a query for the best card to a database in some embodiments, as represented by arrow 862. The database returns the best card for the circumstances as represented by arrow 864, and the algorithm then initiates the payment using the selected card, as represented by arrow 866 by initiating communication with the payment processor. The payment processor then returns an alert to the user device that the card has been charged successfully, as represented by arrow 868.

Referring now to FIG. 9, a combined diagram and flowchart illustrates a splitting sequence process 900 according to embodiments of the invention. First, as represented by arrow 902, the user selects a pay button on the user device, and a landing page sends an alert to point the user device toward the NFC reader or other point of transaction device as necessary to establish an operative connection between the user device and the point of transaction device, as represented by arrow 904. Next, as represented by arrow 906, the user points the user device toward the NFC reader or otherwise manipulates the user device as necessary to establish an operative connection between the user device and the point of transaction device. Next, the NFC reader gets the merchant and amount of the pending transaction from a merchant system, as represented by arrow 908 and the "get best card" algorithm is called and executed with merchant and amount of transaction as inputs, as represented by arrow 910. The algorithm then queries a database for the best card, as represented by arrow 912, from which is returned an array of cards if there is no definitive best card, as represented by arrow 914. The algorithm then alerts that insufficient funds or other error exists and suggests splitting the purchase among multiple cards or other available resources, as represented by arrow 916. Then, the user approves the split by making a selection on the user device, as represented by arrow 918. The landing page then calls and executes a "split payment" algorithm with the cards and balances on the cards as inputs, as represented by arrow 920. The algorithm then charges the selected cards the split amounts to complete the transaction, as represented by arrow 922. Finally, as represented by arrow 924, the payment processor sends an alert that the cards have been charged.

Figure 10A:
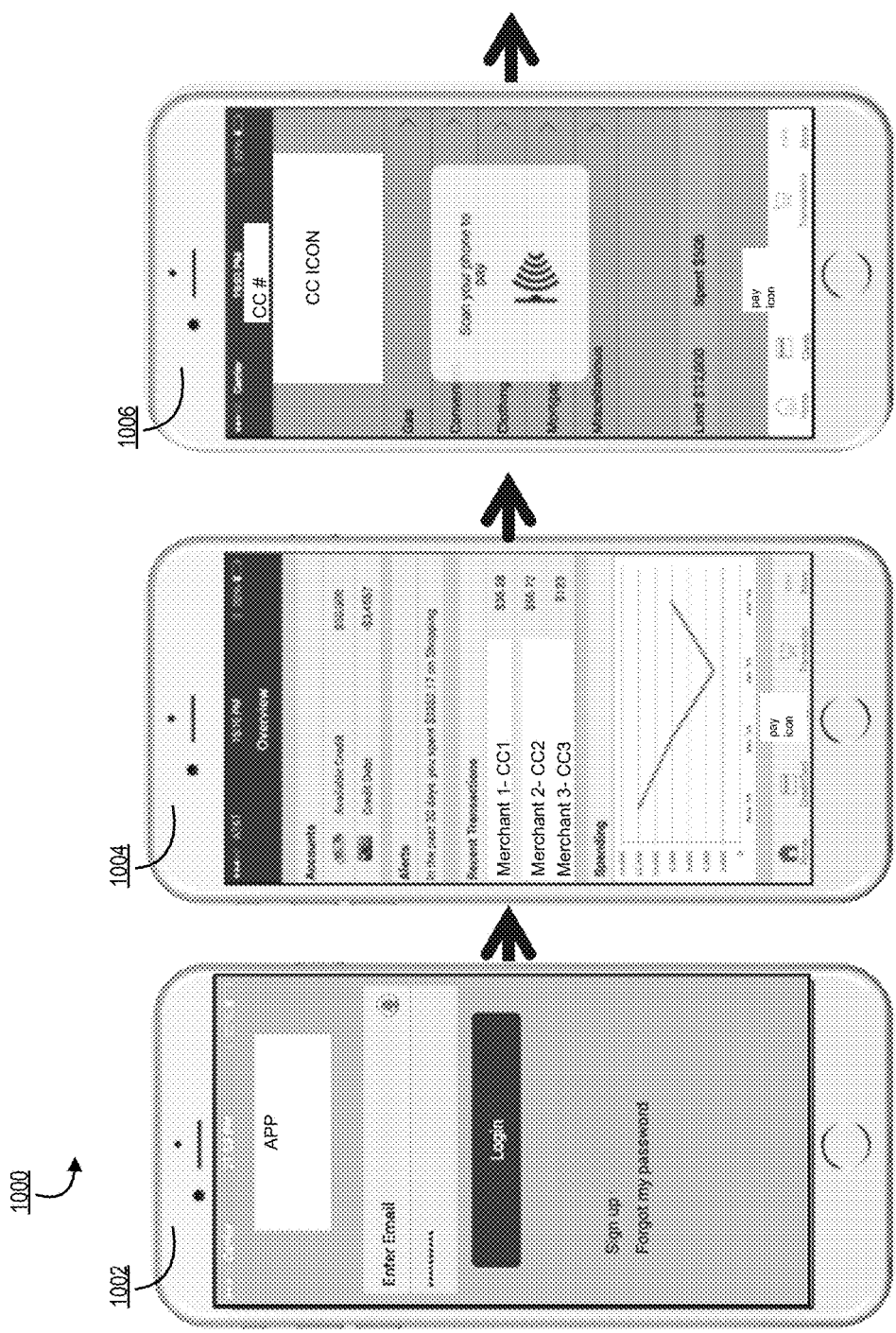
Figure 10B:
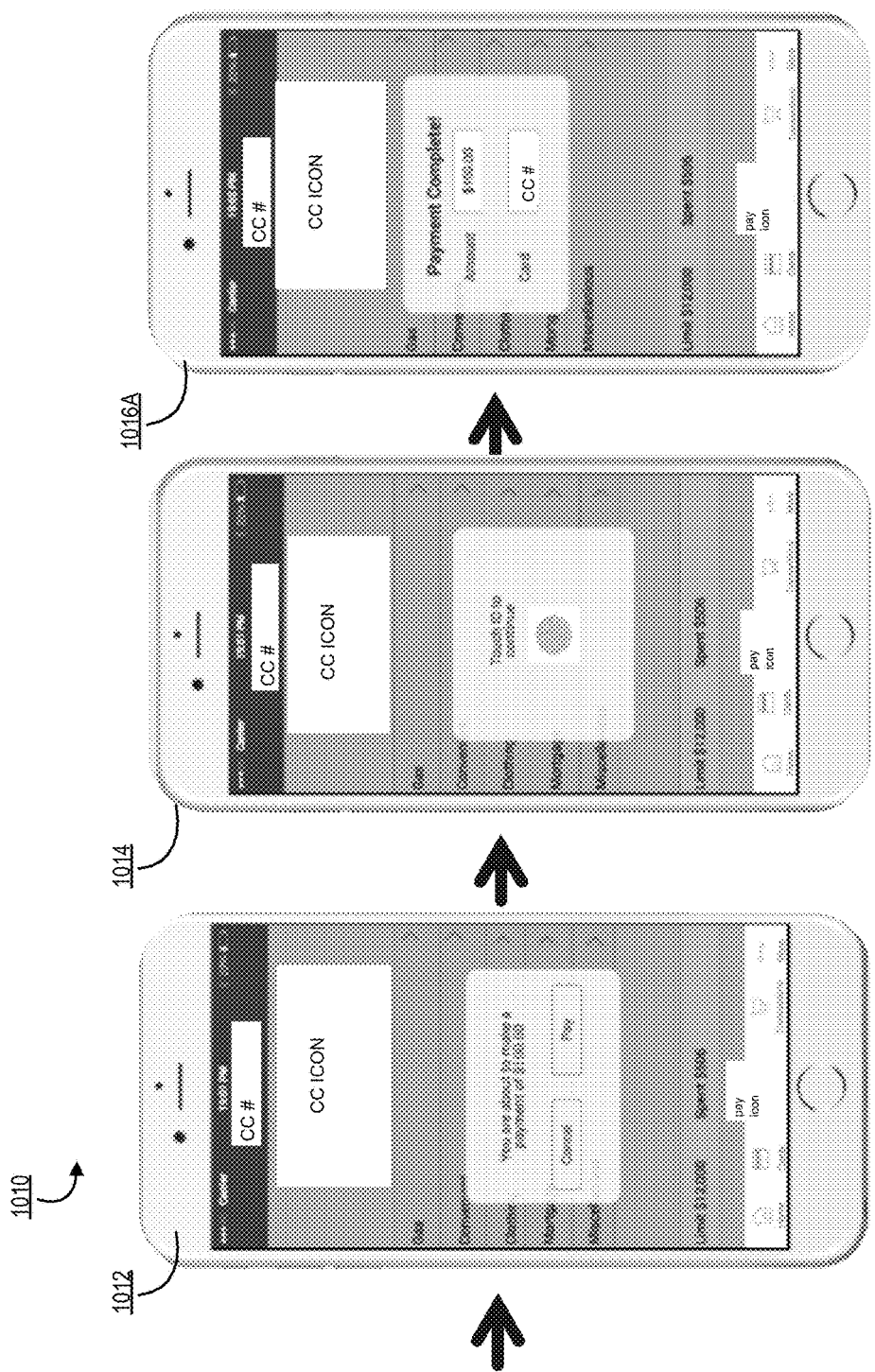
Figure 10C:
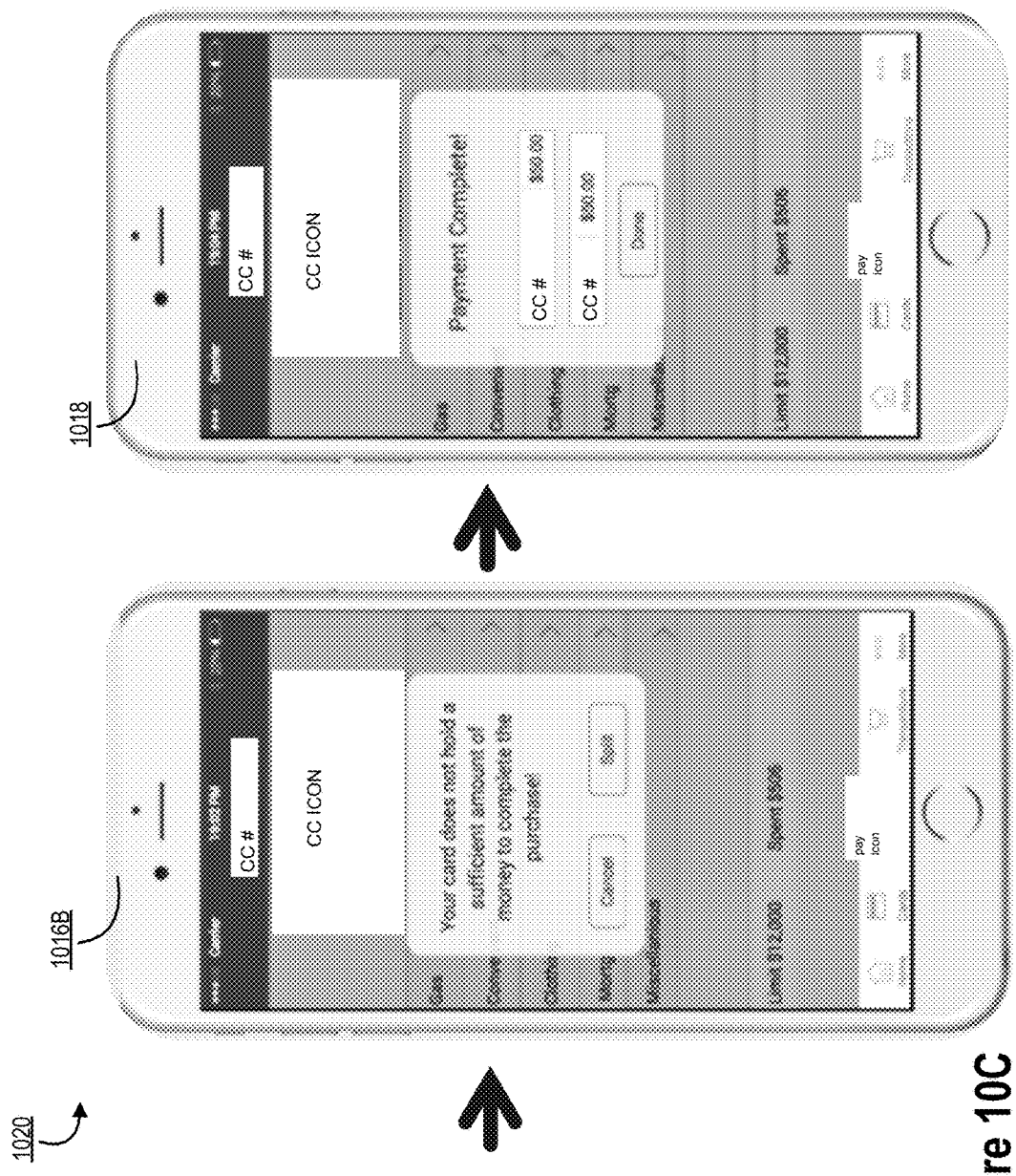
Figure 10D:
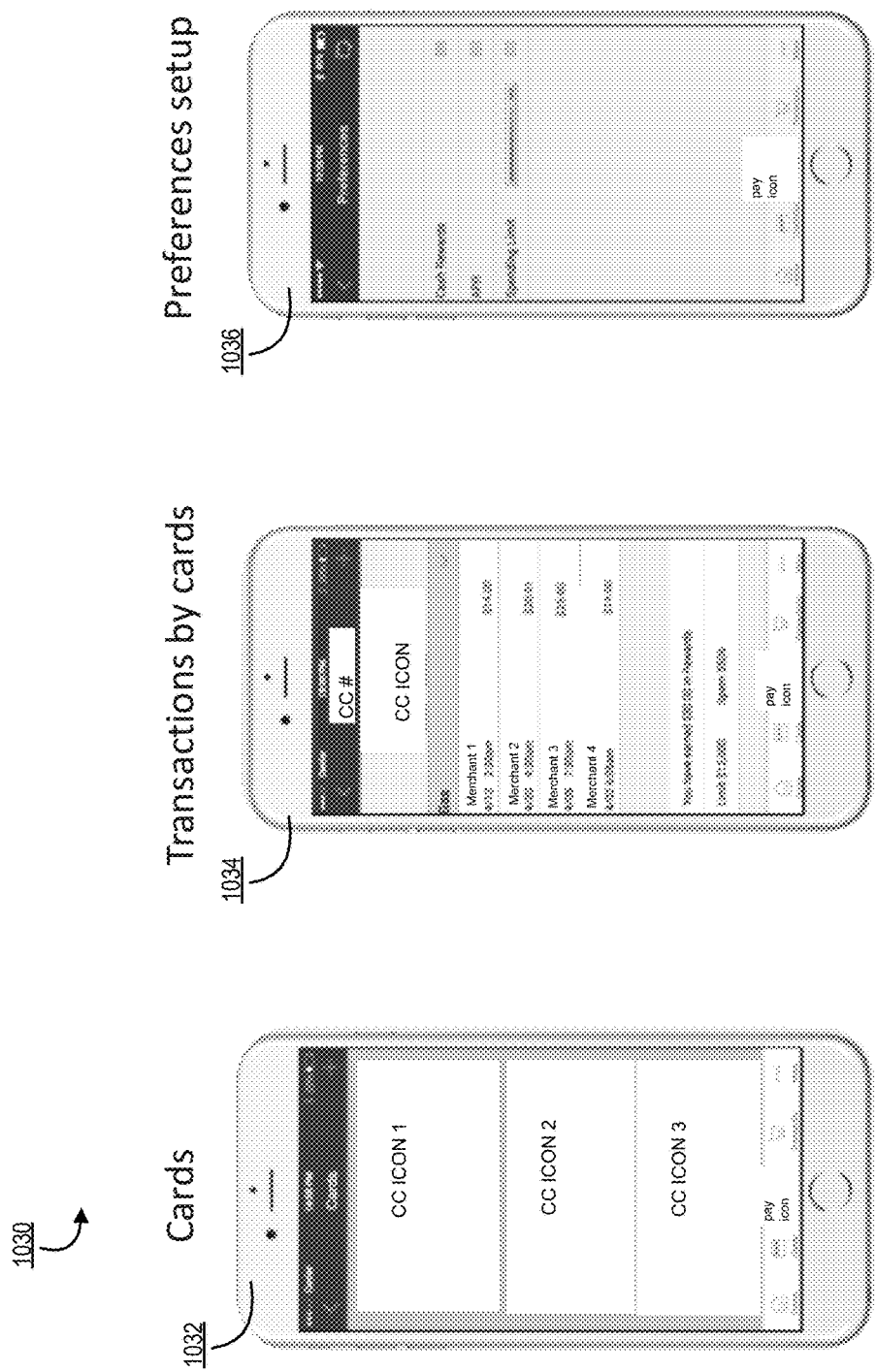

Referring now to FIGS. 10A, 10B, 10C and 10D, various screenshots 1000, 1010, 1020 and 1030 of the user application 222 running on the user device 204 are shown according to embodiments of the invention. In FIG. 10A, the first screenshot 1002 illustrates a log-in page for a user to input authentication credentials. The next screenshot 1004 illustrates an overview page of the user application 222, which includes available resources (accounts), alerts, recent transactions and spending trends, as well as a pay button. Screenshot 1006 illustrates an alert to scan the phone to complete a payment, which was triggered after the user selected the pay button. In FIG. 10B, the first screenshot 1012 illustrates a payment page that also communicates information related to the selected resource for completion of the transaction. The relevant information is provided so that the user can confirm that the user wants to use the automatically selected available resource to complete the transaction. Screenshot 1014 shows a supplemental authentication screen illustrating an additional authentication that may be required in some embodiments before processing the payment. Screenshot 1016A illustrates an alert that the payment has been accepted and provides details about the payment to the user. In FIG. 10C, the first screenshot 1016B illustrates an error alert indicating that the selected card has an insufficient balance to process the transaction, and enables a split option. Screenshot 1018 illustrates that the payment was processed successfully using multiple available resources and indicates details about the transaction. FIG. 10D includes several screenshots 1030 of optional pages of the user application 222. Screenshot 1032 illustrates various available resources, which in this example include multiple payment cards depicted with card icons. Screenshot 1034 illustrates transaction details by account/card, and screenshot 1036 illustrates a preferences setup page, which enables user-input preferences such as prioritizing cash rewards, APR, etc. and establishing spending limit thresholds and the like.

In various embodiments of the invention, the user device and/or the dynamic decisioning system may be leveraged to web browsers to favor online shopping. All sensitive data that includes user information and card information, and public data that includes deals may, in some embodiments, be stored locally on mobile devices or on secured servers. The data communication and synchronization between the mobile version described above and the web version described below occur via an end-to-end encryption when embodiments of this invention are in use. When making a purchase online, the user can choose between the conventional store payment method and "pay with the app". "Pay with the app" enables users to complete the transaction with a single click. This web-based concept also enables a browser plugin/extension at a checkout page. Once the user clicks "Pay with the app", biometric authentication (e.g., fingerprint authentication) will be sent to the mobile device to authorize completion of the transaction.

Referring now to FIG. 11, a flowchart illustrates a method 1100 for dynamic resource selection and implementation for web-based transactions. The first step, as represented by block 1102, is to identify user resources and resource managers and access and/or generate a user profile as described in detail above. Next, as represented by block 1104, the user device 204 or system 208 generates a ranked list of resources, also as discussed in further detail above. Then, as represented by block 1106, the user device 204 or system 208 automatically selects the highest ranked user resource in response to the ranked list being generated (or some other trigger). The next step, as represented by block 1108, is to establish a secure operative connection between the system and an online merchant system. Then, as represented by block 1110, the system 208 or user device 204 initiates an authentication request for the user and receives the user's authentication credentials. In some embodiments, these authentication credentials are biometric credentials such as a fingerprint. Finally, as represented by block 1112, the system 208 or user device 204 transmits, to the online merchant and over the secure operative connection, that authentication was successful.

As an example of the web-based process, a user may be navigating an online merchant's marketplace on the Internet using a web browser on a device, such as a user's laptop, tablet, desktop or other computing device. When the user initiates a transaction to make a purchase through the online marketplace, the user's computing device may provide the user an option to choose between the conventional online marketplace payment processing system or to "pay with the app", which would enable the user to complete the transaction with a single click. More particularly, the user may select to "pay with the app" and an application 222, 258 or other application performs a dynamic resource selection and implementation as discussed in further detail above. The payment credentials are automatically selected and used to complete the transaction. The user may set up supplemental authentication requirements, whereby the user's mobile device may be leveraged to supply a biometric authentication before the transaction is processed.

In various embodiments of the invention, the user device and/or the dynamic decisioning system may be leveraged to itemize transactions by item categories. Based on the user's shopping habits, the application 222 or 158 can utilize item data and/or merchant category data to predict spending, recommend payment credentials (e.g., credit cards) that the users may like, and promote coupons/sales. Based on the user's shopping habits, the application 222 or 158 enables machine learning to fine-tune the user preferences. For example, if the user makes a lot of travel purchases, the application can suggest to the user that, within the credential selection system, the weighting (i.e., the rank) for rewards, that is, how much the rewards criterion is considered in the credential selection algorithm is weighted should be increased. Another example is if the user has heavy balances on his cards, then the application can recommend to the user that the APR be weighted with a higher weighting.

Referring now to FIG. 12, a flowchart illustrates a method 1200 for dynamic intelligent resource selection and implementation. The first step, as represented by block 1202, is to identify user resources and resource managers and access and/or generate a user profile as discussed in detail above. The next step, as represented by block 1204, is for the application 222 or 158 to identify item categories for items included in the pending transaction. As discussed above, items involved in the transaction may be determined by scanning UPC code or other code, taking a photograph of the product(s) and analyzing the photograph to determine the identity of the product(s), RFID or other tag recognition or otherwise. Next, as represented by block 1206, the application 222 or 158 accesses and/or generates a user profile and then, at block 1208, generates ranked list of resources as discussed in further detail above. The next step, as represented by block 1210, is to access additional resource information to determine whether an additional resource would be ranked higher than the highest ranked resource from the generated ranked list of resources. Then, as represented by block 1212, the application 222 or 158 initiates presentation of the additional resource to the user in the case that the additional resource would have ranked at the top of the list. Finally, as represented by block 1214, the application 222 or 158 determines that a different user weighting would result in a more beneficial highest ranked user resource and recommend a re-weighting to the user.

For example, in a case where the user has a relatively high APR on one or more credit cards, the system may determine that a high weighting for APR would be more beneficial to the user and the system then initiates presentation of a recommended re-weighting comprising a higher weighting associated with APR to the user. As another example, the system may determine that a higher weighting for rewards would be more beneficial to the user and then initiates presentation of a recommended re-weighting including a higher weighting associated with the rewards to the user.

In various embodiments, the intelligent resource selection system may provide, to the user, additional resource sign-up information and receive, from the user, confirmation that the user desires to sign-up for the additional resource. The system may, in response to receiving the user's confirmation, automatically sign-up the user for the additional resource. This may be done via an operative connection with the corresponding resource manager. The system may have the necessary information related to the user for completing the application process with the corresponding resource manager, or in some cases, the system may need to request additional information from the user and/or a confirmation from the user that the user wishes for the system to submit the application to the resource manager for the additional resource. In some instances, the system may capture some authentication or confirmation from the user, such as a fingerprint scan or a signature and save the confirmation with the application for submission to the resource manager. The system may then receive confirmation from the resource manager that the user has been successfully signed up for the additional resource. In response to receiving confirmation from the resource manager, the system may then add the additional resource to a digital wallet of the user and complete the pending transaction using the additional resource. In some embodiments, the system may also re-calculate the ranked list of resources using the additional resource and indicate to the user the updated ranked list of resources. This display to the user may include some information regarding the rationale the system used to recommend the resource for the pending transaction, for example, providing information indicating that the user may receive ten percent (10%) cash back when completing the transaction with the additional resource.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with generating communicable linkages for providing a cloud-based dynamic payment decisioning system 208.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for generating communicable linkages for providing a cloud-based dynamic payment decisioning system 208, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 15/228,854 | DYNAMIC CREDENTIAL SELECTION AND IMPLEMENTATION SYSTEM | Aug. 4, 2016 |
| 15/228,858 | ONLINE TRANSACTION EFFICIENCY IMPROVEMENT SYSTEM | Aug. 4, 2016 |

What is claimed is:

1. A system for dynamic intelligent resource selection and implementation, the system comprising:
  a computer apparatus including a processor, a memory device, and a communication device; and
  a software module stored in the memory, comprising computer-readable instructions that when executed by the processor cause the processor to:
    identify user resources and one or more resource managers associated with the identified user resources;
    identify item categories for items included in a pending transaction;
    access a user profile, wherein the user profile comprises user resources, user preferences, historic resource trends associated with a user account, and resource manager terms for resource use, wherein the historic resource trends associated with the user account comprises behavioral tendencies of the user;
    access a social media account of the user;
    identify a behavioral tendency of the user by recognizing a word frequently employed by the user on the social media account of the user;
    based on the behavioral tendency, generate a ranked list of resources for providing a total resource amount to a merchant, wherein the ranked list comprises a highest ranked user resource;
generate a confidence score of each of the resources on the ranked list of resources, wherein the confidence score comprises a confidence that a user will employ a specific resource for providing the total resource amount to the merchant and completing a transaction, wherein generating the confidence score is based on weighted factors, wherein the weighted factors comprise in descending order of weighted value: user preferences, past transaction data, historic resource trends associated with the user account, and location data associated with the user;
identify a first resource on the ranked list of resources with a confidence score that meets or exceeds a predetermined confidence limit;
access additional resource information to determine whether an additional resource would be ranked higher than the highest ranked user resource based on the items being purchased; and
initiate transmission of credential associated with the additional resource to the merchant for providing the total resource amount to the merchant based on at least determining that the additional resource would be ranked higher than the highest ranked user resource.

2. The system of claim 1, wherein the computer-readable instructions when executed by the processor further cause the processor to:
in response to generating the ranked list of resources, automatically select the highest ranked user resource for providing the total resource amount to the merchant; and
initiate transmission of credential associated with the selected user resource to the merchant for providing the total resource amount to the merchant.

3. The system of claim 1, wherein the computer-readable instructions when executed by the processor further cause the processor to:
in response to generating a ranked list of resources, determine whether a different user weighting would result in a more beneficial highest ranked user resource for performing the pending transaction; and
if so, initiate presentation of a recommended re-weighting to the user.

4. The system of claim 3, wherein the computer-readable instructions when executed by the processor further cause the processor to:
determine that a higher weighting for rewards would be more beneficial to the user; and
initiate presentation of a recommended re-weighting comprising a higher weighting associated with rewards to the user.

5. The system of claim 4, wherein determining comprises determining that the item categories include items that match rewards associated with at least one of the resources available to the user for payment.

6. The system of claim 3, wherein the computer-readable instructions when executed by the processor further cause the processor to:
determine that a high weighting for APR would be more beneficial to the user; and
initiate presentation of a recommended re-weighting comprising a higher weighting associated with APR to the user.

7. The system of claim 6, wherein determining comprises determining that at least one account associated with a resource available to the user has an APR above a high threshold.

8. The system of claim 1, wherein the computer-readable instructions when executed by the processor further cause the processor to:
trigger a communicable linkage with the one or more resource managers based on receiving a determined total resource amount required by a merchant;
open the communicable linkage with the one or more resource managers for resource manager updating resource characteristics associated with the user resources.

9. The system of claim 8, wherein triggering the communicable linkage with the one or more resource managers based on determining the total resource amount required by the merchant further comprises:
receiving from the user device the determined total resource amount required by the merchant; and
in response to receiving from the user device the determined total resource amount required by the merchant, establishing a communication link between the user device and the cloud-based dynamic resource selection and implementation system.

10. The system of claim 1, wherein the computer-readable instructions when executed by the processor further cause the processor to:
initiate presentation of the selected user resource and the ranked list of resources from the one or more resource managers to the user device; and
enable user selection of one of the ranked list of resources for providing the total resource amount to the merchant.

11. The system of claim 1, wherein the computer-readable instructions when executed by the processor further cause the processor to:
transmit, based on identifying the first resource, the first resource on the ranked list of resources, to the merchant for providing the total resource amount to the merchant and completing the transaction.

12. The system of claim 1, wherein the one or more resource managers comprise financial institutions that provide a debit card, credit card, and/or line of credit to the user for providing the total resource amount to the merchant and completing a transaction.

13. The system of claim 1, wherein generating the ranked list of resources from the one or more resource managers further comprises analyzing the user preferences, wherein the user preferences include a preferred form of reward, incentive, and/or discount such as cash back, more reward points, lower interest rates, and/or the like provided to the user by an associated resource relative to resource characteristics set forth by the one or more resource managers.

14. The system of claim 1, wherein generating the user profile comprises:
pushing a user profile comprising user preference selectable indicators to the user device;
receiving selected user preferences from the user device based on the pushing of the user profile;
identifying historic trends associated with user accounts; and
allowing the user to modify the user specific competitive proposal profile on the user device.

15. The system of claim 1, wherein the computer-readable instructions when executed by the processor further cause the processor to:

generate a cloud-based dynamic payment decisioning application, wherein the cloud-based dynamic payment decisioning application enables for communicable linkage between the resource managers systems, the user device, and a merchant point-of-transaction device for integrative transaction completion.

16. The system of claim 1, wherein the computer-readable instructions when executed by the processor further cause the processor to:
provide, to the user, additional resource sign-up information;
receive, from the user, confirmation that the user desires to sign-up for the additional resource;
in response, automatically sign-up the user for the additional resource;
receive confirmation from a resource manager corresponding to the additional resource that the user has been successfully signed up for the additional resource;
in response to receiving confirmation from the resource manager, add the additional resource to a digital wallet of the user; and
complete the pending transaction using the additional resource.

17. A computer program product for dynamic intelligent resource selection and implementation, the computer program product comprising at least one non-transitory computer-readable medium having computer-readable program code portions embodied therein, the computer-readable program code portions comprising:
an executable portion configured for identifying user resources and one or more resource managers associated with the identified user resources;
an executable portion configured for identifying item categories for items included in a pending transaction;
an executable portion configured for accessing a user profile, wherein the user profile comprises user resources, user preferences, historic resource trends associated with a user account, and resource manager terms for resource use, wherein the historic resource trends associated with the user account comprises behavioral tendencies of the user:
an executable portion configured for accessing a social media account of the user;
an executable portion configured for identifying a behavioral tendency of the user by recognizing a word frequently employed by the user on the social media account of the user;
an executable portion configured for, based on the behavioral tendency, generating a ranked list of resources for providing a total resource amount to a merchant, wherein the ranked list comprises a highest ranked user resource;
an executable portion configured for generating a confidence score of each of the resources on the ranked list of resources, wherein the confidence score comprises a confidence that a user will employ a specific resource for providing the total resource amount to the merchant and completing a transaction, wherein generating the confidence score is based on weighted factors, wherein the weighted factors comprise in descending order of weighted value: user preferences, past transaction data, historic resource trends associated with the user account, and location data associated with the user;
an executable portion configured for identifying a first resource on the ranked list of resources with a confidence score that meets or exceeds a predetermined confidence limit;
an executable portion configured for accessing additional resource information to determine whether an additional resource would be ranked higher than the highest ranked user resource based on the items being purchased; and
an executable portion configured for initiating transmission of credential associated with the additional resource to the merchant for providing the total resource amount to the merchant based on at least determining that the additional resource would be ranked higher than the highest ranked user resource.

18. The computer program product of claim 17, wherein the computer-readable program code further comprises:
an executable portion configured for, in response to generating the ranked list of resources, automatically selecting the highest ranked user resource for providing the total resource amount to the merchant; and
an executable portion configured for initiating transmission of credential associated with the selected user resource to the merchant for providing the total resource amount to the merchant.

19. The computer program product of claim 17, wherein the computer-readable program code further comprises:
an executable portion configured for, in response to generating a ranked list of resources, determining whether a different user weighting would result in a more beneficial highest ranked user resource for performing the pending transaction; and
an executable portion configured for, if so, initiate presentation of a recommended re-weighting to the user
an executable portion configured for determining that a higher weighting for rewards would be more beneficial to the user; and
an executable portion configured for initiating presentation of a recommended re-weighting comprising a higher weighting associated with rewards to the user.

20. A computer-implemented method for dynamic intelligent resource selection and implementation, the method comprising:
identifying user resources and one or more resource managers associated with the identified user resources;
identifying item categories for items included in a pending transaction;
accessing a user profile, wherein the user profile comprises user resources, user preferences, historic resource trends associated with a user account, and resource manager terms for resource use, wherein the historic resource trends associated with the user account comprises behavioral tendencies of the user;
access a social media account of the user;
identifying a behavioral tendency of the user by recognizing a word frequently employed by the user on the social media account of the user;
based on the behavioral tendency, generating a ranked list of resources for providing a total resource amount to a merchant, wherein the ranked list comprises a highest ranked user resource;
generating a confidence score of each of the resources on the ranked list of resources, wherein the confidence score comprises a confidence that a user will employ a specific resource for providing the total resource amount to the merchant and completing a transaction, wherein generating the confidence score is based on weighted factors, wherein the weighted factors comprise in descending order of weighted value: user preferences, past transaction data, historic resource trends associated with the user account, and location data associated with the user;

identifying a first resource on the ranked list of resources with a confidence score that meets or exceeds a predetermined confidence limit;

accessing additional resource information to determine whether an additional resource would be ranked higher than the highest ranked user resource based on the items being purchased; and initiating transmission of credential associated with the additional resource to the merchant for providing the total resource amount to the merchant based on at least determining that the additional resource would be ranked higher than the highest ranked user resource.

* * * * *